(12) United States Patent
Teerlink

(10) Patent No.: US 8,894,081 B2
(45) Date of Patent: Nov. 25, 2014

(54) SIDE-BY-SIDE BICYCLE ADAPTER

(71) Applicant: eMetrus, Inc., Salt Lake City, UT (US)

(72) Inventor: A. Steven Teerlink, Salt Lake City, UT (US)

(73) Assignee: eMetrus, Inc., Salt Lake City, UT (US)

(*) Notice: Subject to any disclaimer, the term of this patent is extended or adjusted under 35 U.S.C. 154(b) by 0 days.

(21) Appl. No.: 14/019,446

(22) Filed: Sep. 5, 2013

(65) Prior Publication Data

US 2014/0070513 A1 Mar. 13, 2014

Related U.S. Application Data

(60) Provisional application No. 61/698,000, filed on Sep. 7, 2012.

(51) Int. Cl.
*B62K 3/12* (2006.01)
*B62K 5/08* (2006.01)
*B62K 13/06* (2006.01)
*B62K 21/00* (2006.01)

(52) U.S. Cl.
CPC . *B62K 3/12* (2013.01); *B62K 21/00* (2013.01); *B62K 5/08* (2013.01); *B62K 13/06* (2013.01)
USPC ............................ 280/209; 280/231; 280/267

(58) Field of Classification Search
CPC ............ B62K 3/12; B62K 21/00; B62K 5/08; B62K 5/10; B62K 13/06; B62K 2700/54; B62K 2300/125
USPC ......... 280/209, 202, 203, 204, 267, 273, 259, 280/260, 7.16, 231
See application file for complete search history.

(56) References Cited

U.S. PATENT DOCUMENTS

| | | | | |
|---|---|---|---|---|
| 565,443 | A | * | 8/1896 | Eells ............................ 280/209 |
| 616,407 | A | * | 12/1898 | Cottrell et al. ................ 280/209 |
| 822,688 | A | * | 6/1906 | Nicholas ....................... 280/209 |
| 1,522,039 | A | * | 1/1925 | Swearinger ................... 280/209 |
| 3,768,834 | A | * | 10/1973 | Singleton ...................... 280/209 |
| 3,794,352 | A | * | 2/1974 | Popp ............................. 280/209 |
| 3,836,175 | A | * | 9/1974 | Pomerance et al. .......... 280/209 |
| 3,865,401 | A | * | 2/1975 | Kingsly ......................... 280/209 |
| 3,902,738 | A | * | 9/1975 | Gandrud ....................... 280/209 |
| 4,290,620 | A | | 9/1981 | Chika |
| 5,511,809 | A | | 4/1996 | Sagi |
| 6,022,036 | A | * | 2/2000 | Chartrand ..................... 280/209 |
| 2003/0127821 | A1 | * | 7/2003 | McCandless ................. 280/209 |
| 2010/0314852 | A1 | * | 12/2010 | Chin et al. .................... 280/209 |

FOREIGN PATENT DOCUMENTS

| | | |
|---|---|---|
| EP | 2 060 477 A1 | 5/2009 |
| JP | 2003-327189 A | 11/2003 |
| JP | 2006-224797 A | 8/2006 |

* cited by examiner

*Primary Examiner* — Anne Marie Boehler
(74) *Attorney, Agent, or Firm* — David R. Conklin; Kirton McConkie

(57) ABSTRACT

An adapter for interconnecting two bicycles in a side-by-side configuration, wherein the adapter comprises a plurality of articulating joints to permit the joined bicycles to articulate or tilt in coordination while being ridden. The present invention further includes various tilting mechanisms and braking systems to achieve and maintain desired tilted positions of the joined or interconnected bicycles.

14 Claims, 36 Drawing Sheets

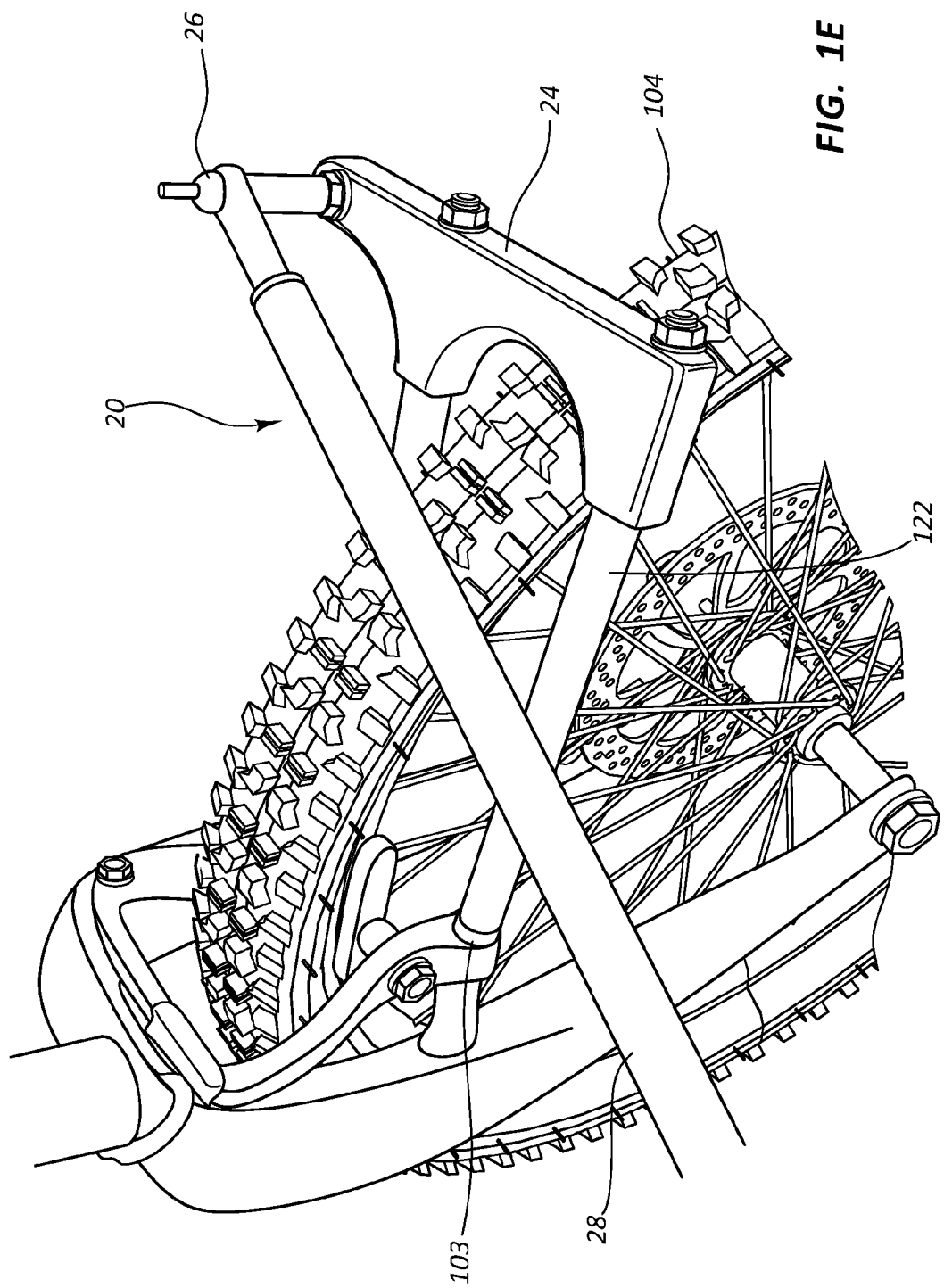

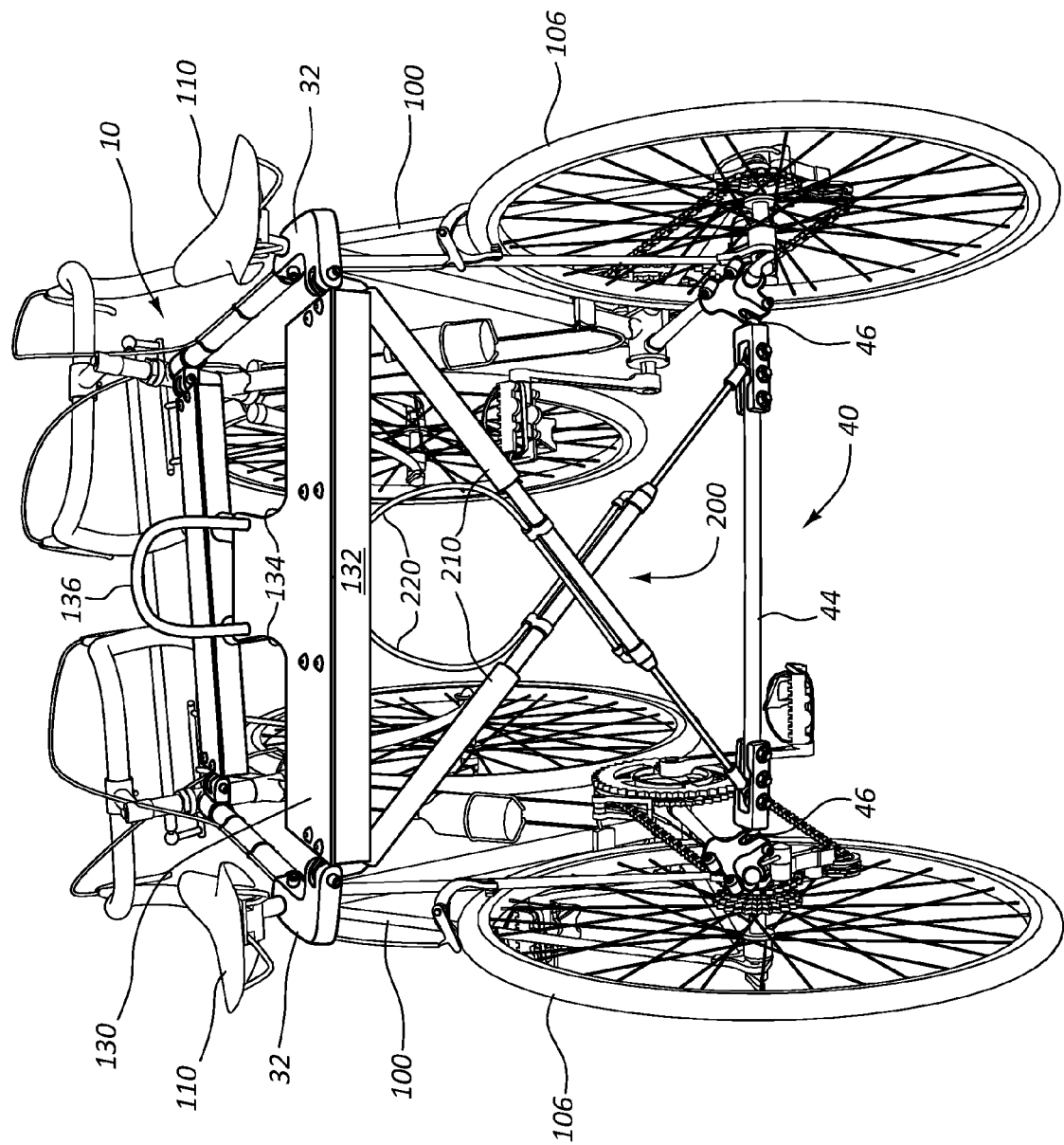

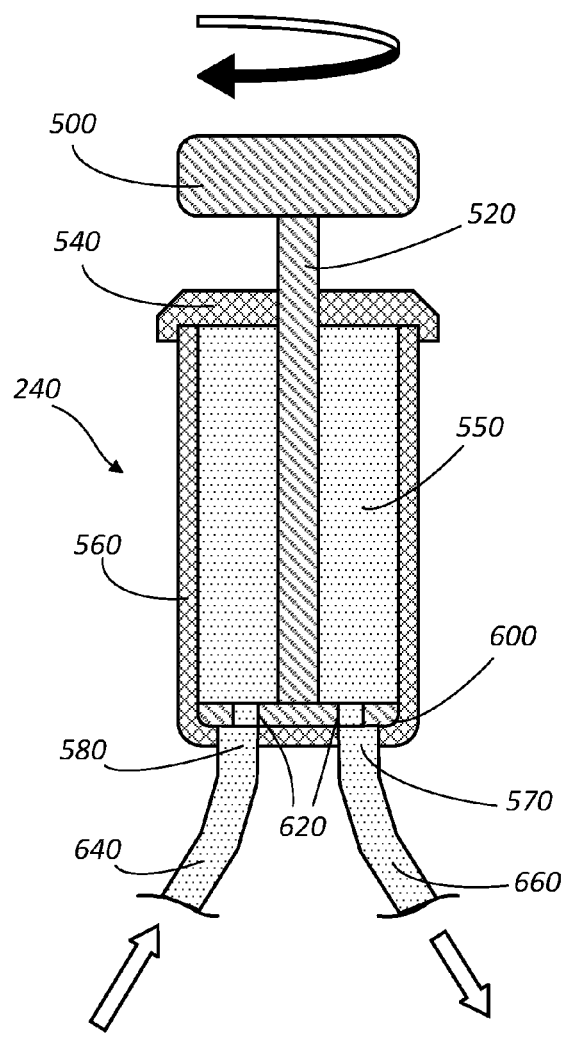
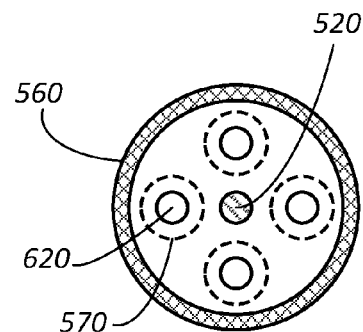
FIG. 22B
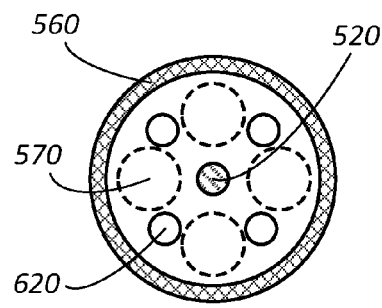
FIG. 22C
FIG. 22A

SIDE-BY-SIDE BICYCLE ADAPTER

RELATED APPLICATIONS

This application is a claims priority to U.S. Provisional Application Ser. No. 61/698,000, filed on Sep. 7, 2012, entitled SIDE-BY-SIDE BICYCLE ADAPTER, and is incorporated herein.

BACKGROUND OF THE INVENTION

The current invention relates to a bicycle adapter that is designed to couple together two bicycles in a side-by-side configuration. The current invention includes a plurality of clamps that attach the bicycle adapter to the two bicycles at various specified locations. Each clamp comprises an articulating joint which permits the joined bicycles to articulate in coordination while being ridden.

A sociable, side-by-side, or buddy bicycle is a style of bicycle designed to be ridden by more than one person in a side-by-side fashion. Side-by-side bicycles are specialized vehicles that are designed for the express and limited purpose of accommodating multiple riders. While a side-by-side bicycle may be ridden by a single rider, the design of the bicycle is not optimized for single rider use.

Further, side-by-side bicycles generally comprise some type of conjoined bicycles that provide a rigid final product. Rigidity may be desired to combat independent movement between the two riders, where independent movement may result in imbalance or improper pedaling mechanics. However, the act of limiting independent movement of the riders may result in discomfort to the riders and may provide dangerous riding conditions based on limiting the riders' abilities to react to obstacles and riding conditions. Thus, although solutions currently exist for providing side-by-side bicycles, challenges still exist. The present invention addresses and overcomes these challenges.

BRIEF SUMMARY OF THE INVENTION

In order to overcome the limitations discussed above, the present invention relates to a side-by-side bicycle adapter that is designed to couple together two bicycles in a side-by-side configuration. The current invention includes a plurality of clamps that attach the side-by-side bicycle adapter to the two bicycles at various specified locations. Each clamp comprises an articulating joint which permits the joined bicycles to articulate in coordination while being ridden.

The instant invention provides a side-by-side bicycle adapter that facilitates the selective joining of two single-rider bicycles into a side-by-side bicycle. The instant invention may be used to join two bicycles in a side-by-side configuration. In some instances, two bicycles are joined together having different sizes, styles and/or frame configurations. In some implementations of the present invention, a side-by-side bicycle adapter is provided which includes a steering connection assembly having a first connector configured to attach to the forks of a first bicycle, and further having a second connector configured to attach to the forks of a second bicycle, the steering connection assembly further comprising a track rod having a first ball joint connection with the first connector and a second ball joint connection with the second connector. The adapter further includes a main connector carriage having a forward cross-member interconnecting the first and second bicycles at a forward portion, the forward cross-member providing a first bearing connection between the first and second bicycles, a rearward cross-member interconnecting the first and second bicycles at a rearward portion, the rearward cross-member providing a second bearing connection between the first and second bicycles, a central support interconnecting the forward and rearward cross-members, and a limiting box coupled to the central support and comprising a channel. Some implementations of the present invention further include a rear axle connector having a cross-member and a vertical pole, the cross-member providing a third bearing connection approximately between a rear axle of the first bicycle and a rear axle of the second bicycle, the vertical pole having a length sufficient to position the a portion of the vertical pole in the channel of the limiting box.

The side-by-side bicycle adapter of the present invention may further comprise one or more hydraulic cylinders, hydraulic valves, hydraulic reservoirs, hydraulic hoses, master stop valves, and dampening systems provided as part of a tilting mechanism.

The side-by-side bicycle adapter of the present invention may be added to, and removed from a pair of bicycles as desired. Further, the articulated joints of the adapter permit natural articulation of the interconnected bicycles during riding. This feature allows the riders to react to obstacles and riding conditions in a similar manner to how a rider would typically react while riding a single-rider bicycle. Further, the adapter of the present invention provides a side-by-side bicycle that permits vertical displacement of one bicycle relative to the position of the second bicycle to compensate for unequal elevations of the bicycles during riding.

The present invention further includes various systems and methods to permit controlled tilting of the side-by-side bicycle adapter. In some instances, the present invention further includes a braking system configured to prevent and/or maintain a desired tilted position of the bicycles interconnected via a side-by-side bicycle adapter.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. These drawings depict only typical embodiments of the invention and are not therefore to be considered to limit the scope of the invention.

FIG. 1E is a perspective view of a steering connection assembly in accordance with a representative embodiment of the present invention.

FIG. 17 is a perspective view of a side-by-side bicycle adapter with a hydraulic tilting mechanism in accordance with various representative embodiments of the present invention.

FIG. 22A is a cross-section side view of a master stop valve in accordance with a representative embodiment of the present invention.

FIGS. 22B and 22C provide cross-section top views of the master stop valve shown in FIG. 22A.

DETAILED DESCRIPTION OF THE INVENTION

The presently preferred embodiment of the present invention will be best understood by reference to the drawings, wherein like reference numbers indicate identical or functionally similar elements. It will be readily understood that the components of the present invention, as generally described and illustrated in the figures herein, could be arranged and designed in a wide variety of different configurations. Thus, the following more detailed description, as represented in the figures, is not intended to limit the scope of the invention as claimed, but is merely representative of presently preferred embodiments of the invention.

As used herein, the term "side-by-side bicycle" is understood to include any bicycle that supports two riders who sit side by side. One having skill in the art will appreciate that the term "side-by-side" is equivalent to a sociable bicycle and/or a buddy bicycle, as known and used in the art.

Figure 1A:
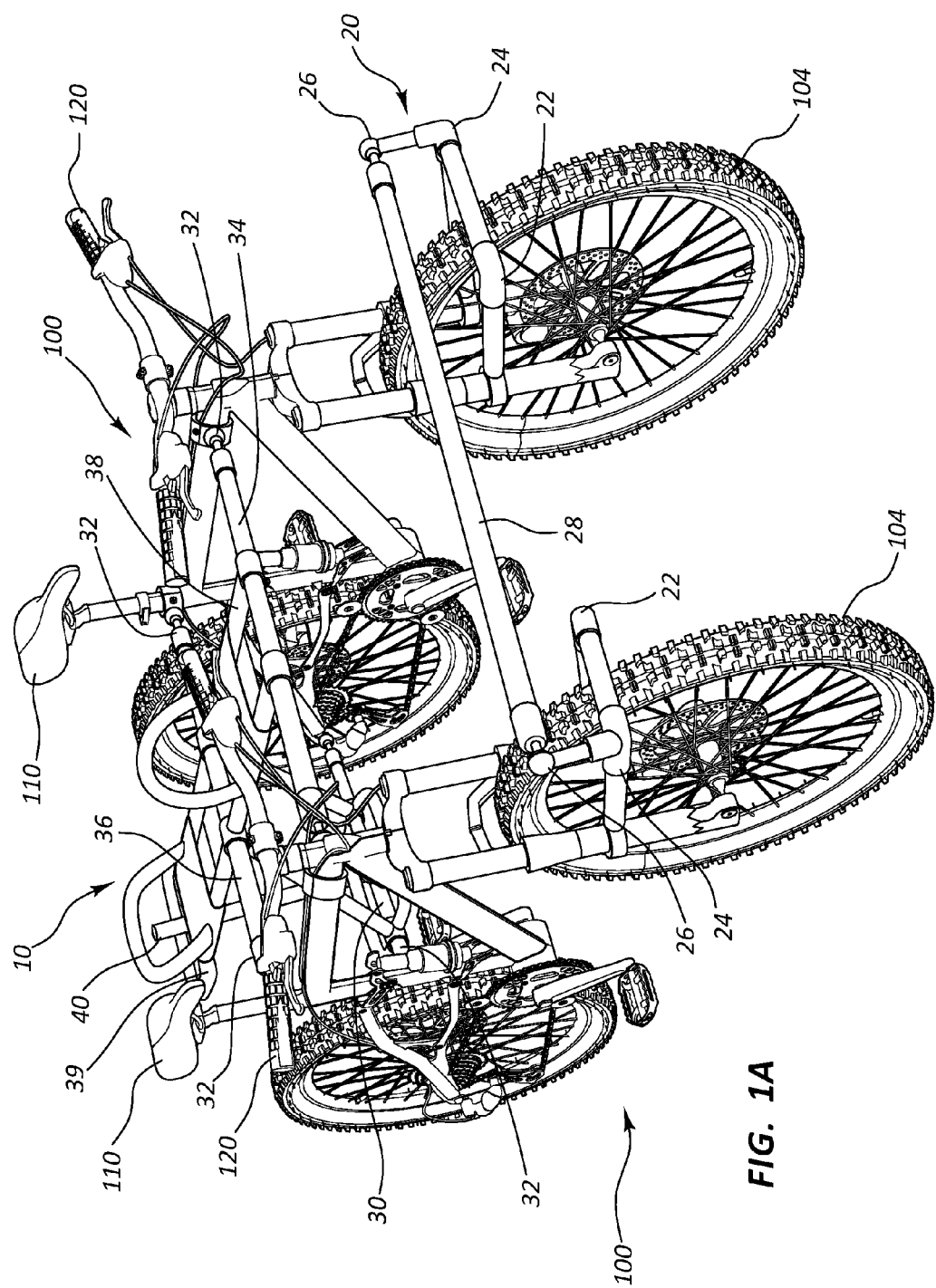
FIG. 1A is a perspective front view of a side-by-side bicycle adapter installed on a pair of bicycles in accordance with a representative embodiment of the present invention.
Figure 1B:
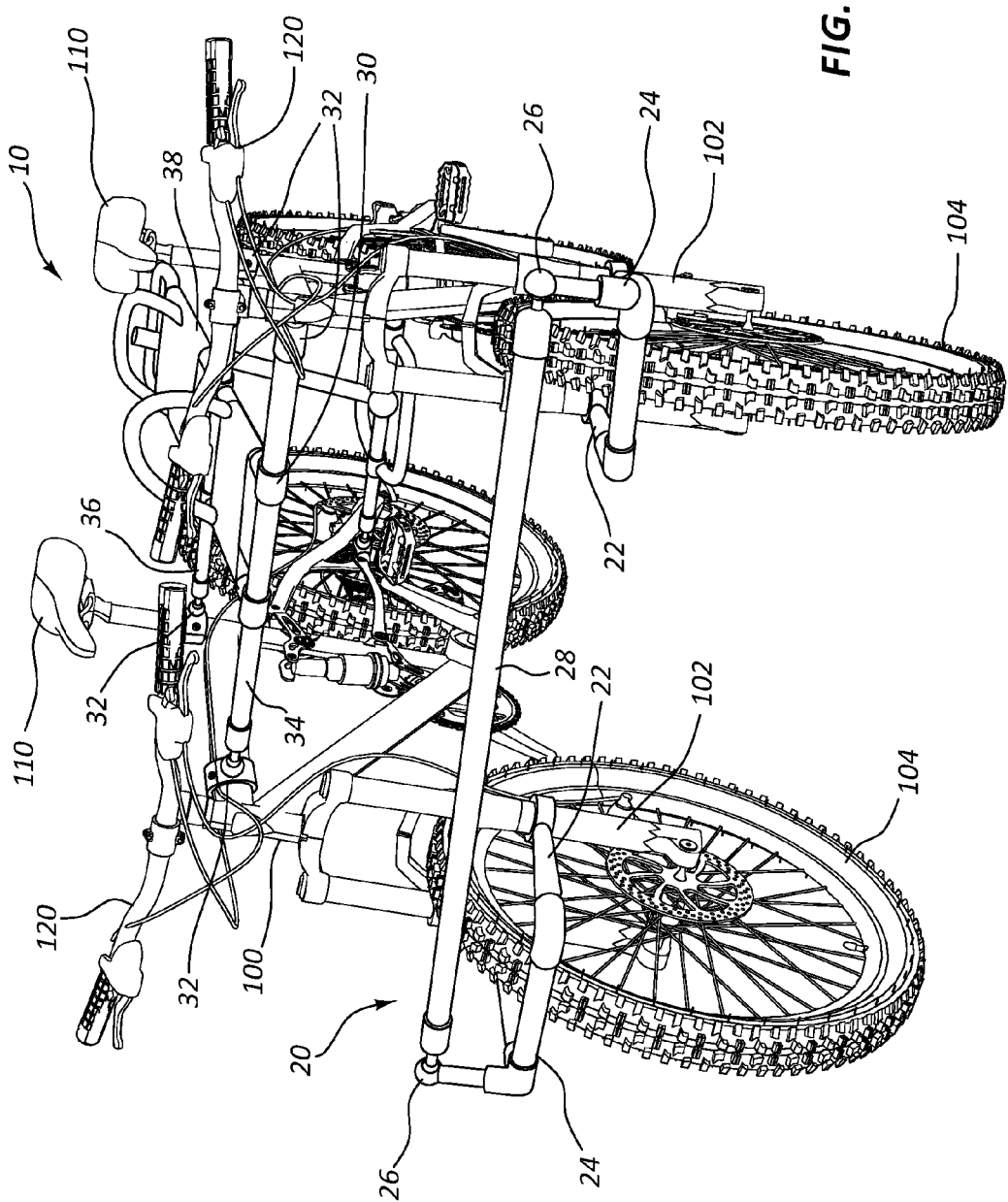
FIG. 1B is a perspective front view of a side-by-side bicycle adapter installed on a pair of bicycles in accordance with a representative embodiment of the present invention.
Figure 1D:
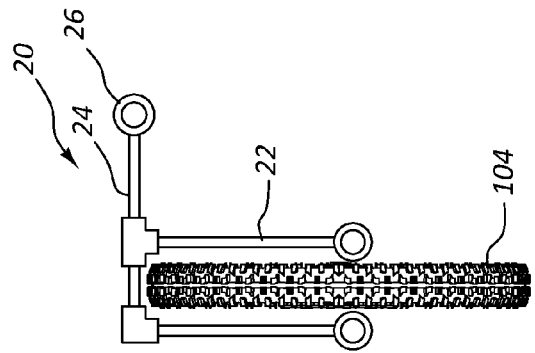
FIG. 1D is a perspective top view of a steering connection assembly in accordance with a representative embodiment of the present invention.
Figure 1C:
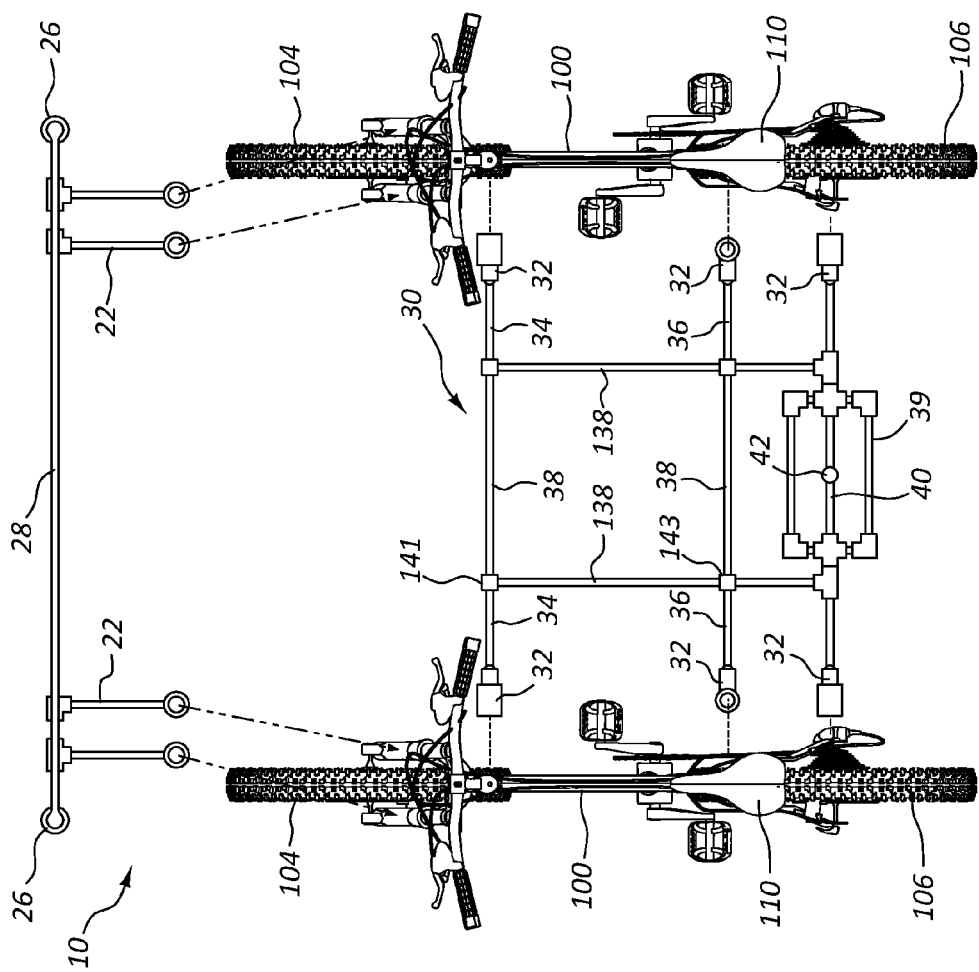
FIG. 1C is an exploded top view of a side-by-side bicycle adapter prior to installation in accordance with a representative embodiment of the present invention
Figure 2:
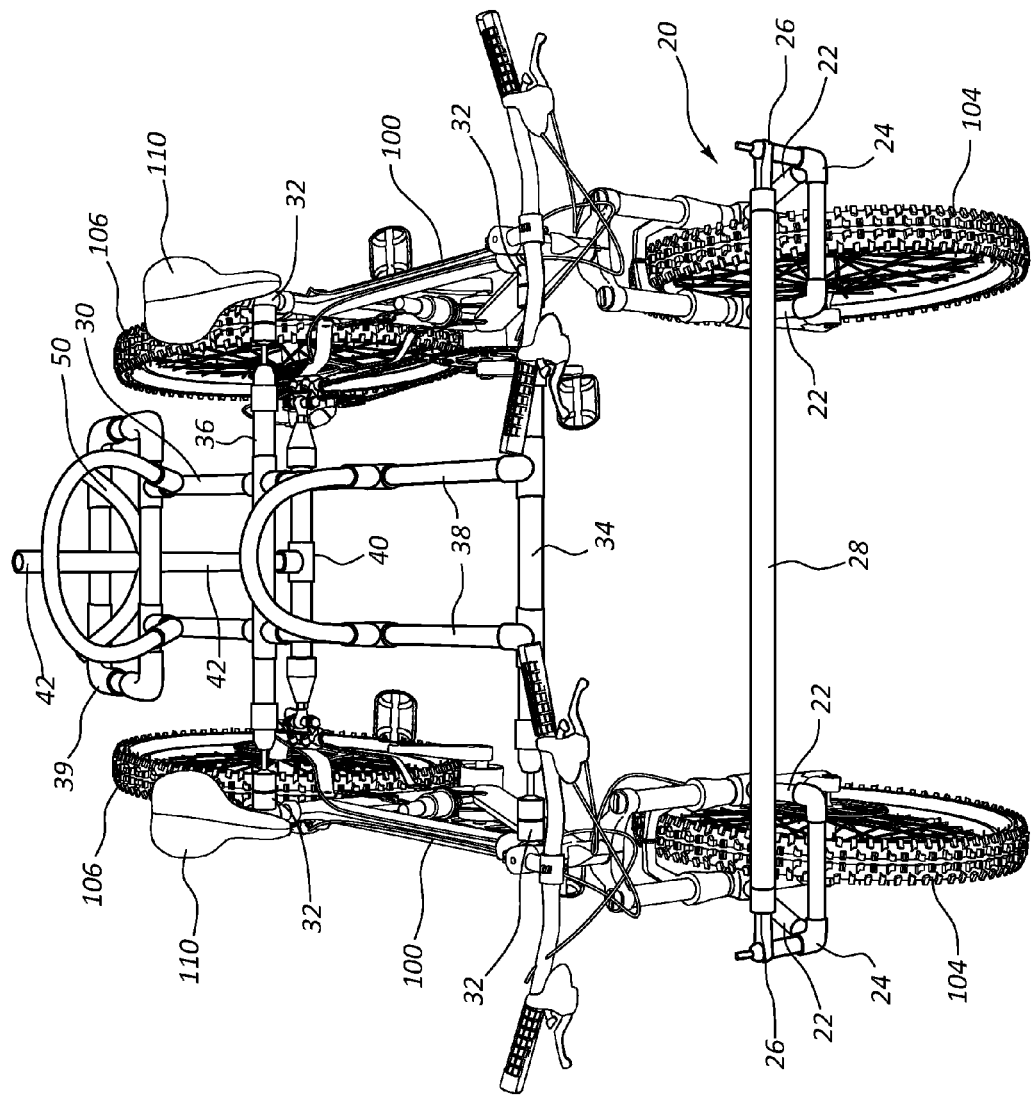
FIG. 2 is a perspective top front view of a side-by-side bicycle adapter installed on a pair of bicycles in accordance with a representative embodiment of the present invention.
Figure 3:
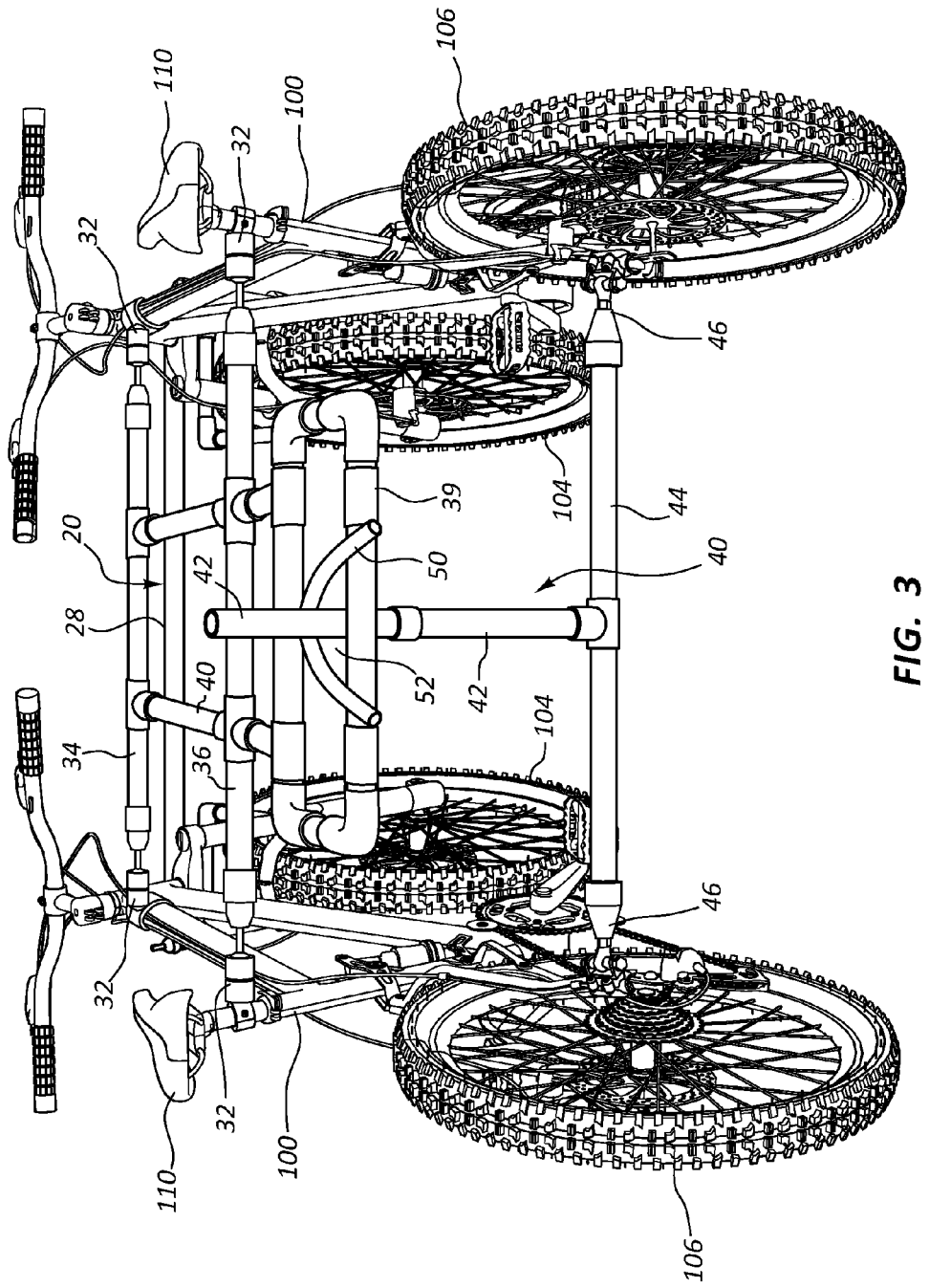
FIG. 3 is a perspective rear view of a side-by-side bicycle adapter installed on a pair of bicycles in accordance with a representative embodiment of the present invention.
Figure 4:
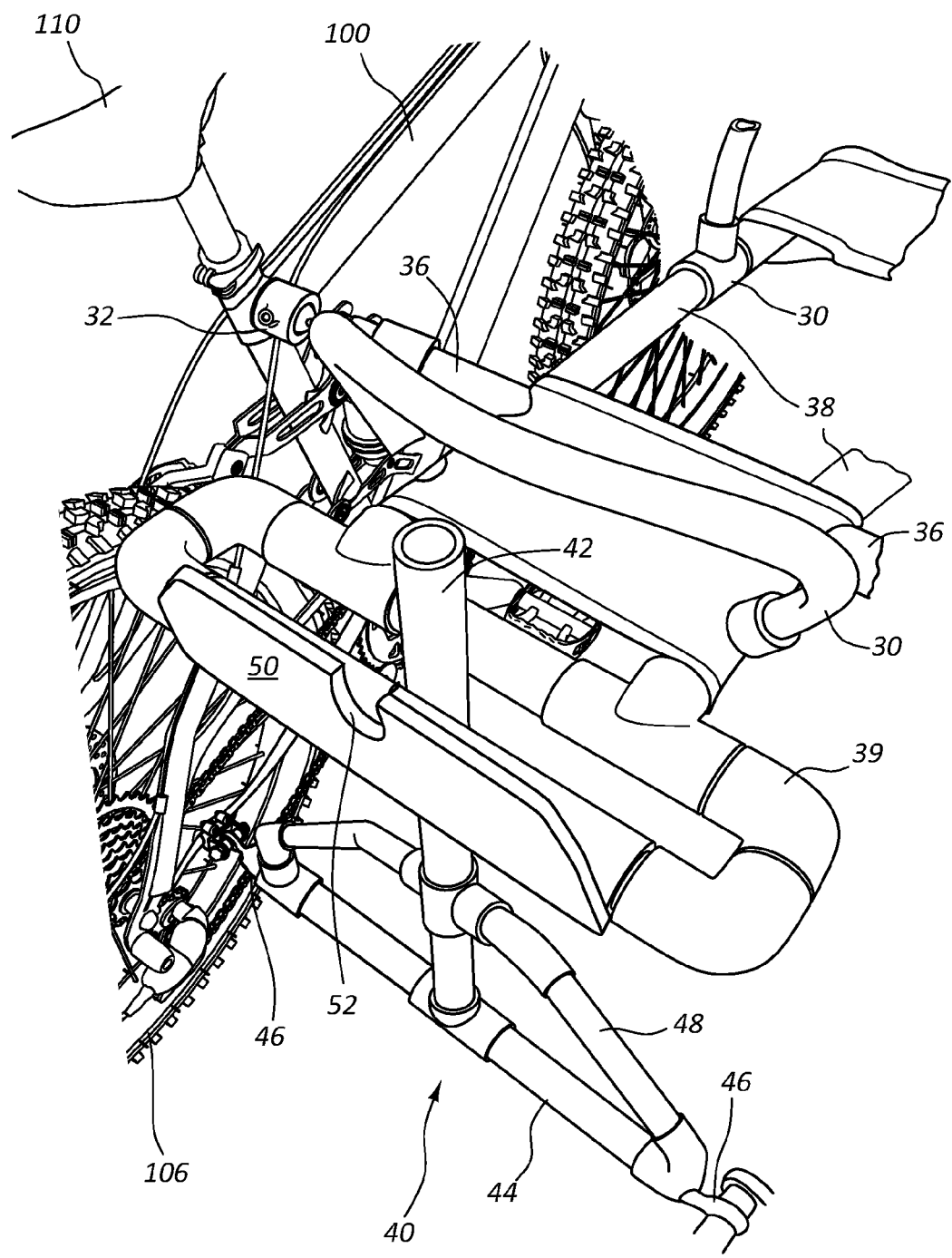
FIG. 4 is a perspective top view of a main connector carriage and a rear axle connector of a side-by-side bicycle adapter installed on a pair of bicycles in accordance with a representative embodiment of the present invention.
Figure 5:
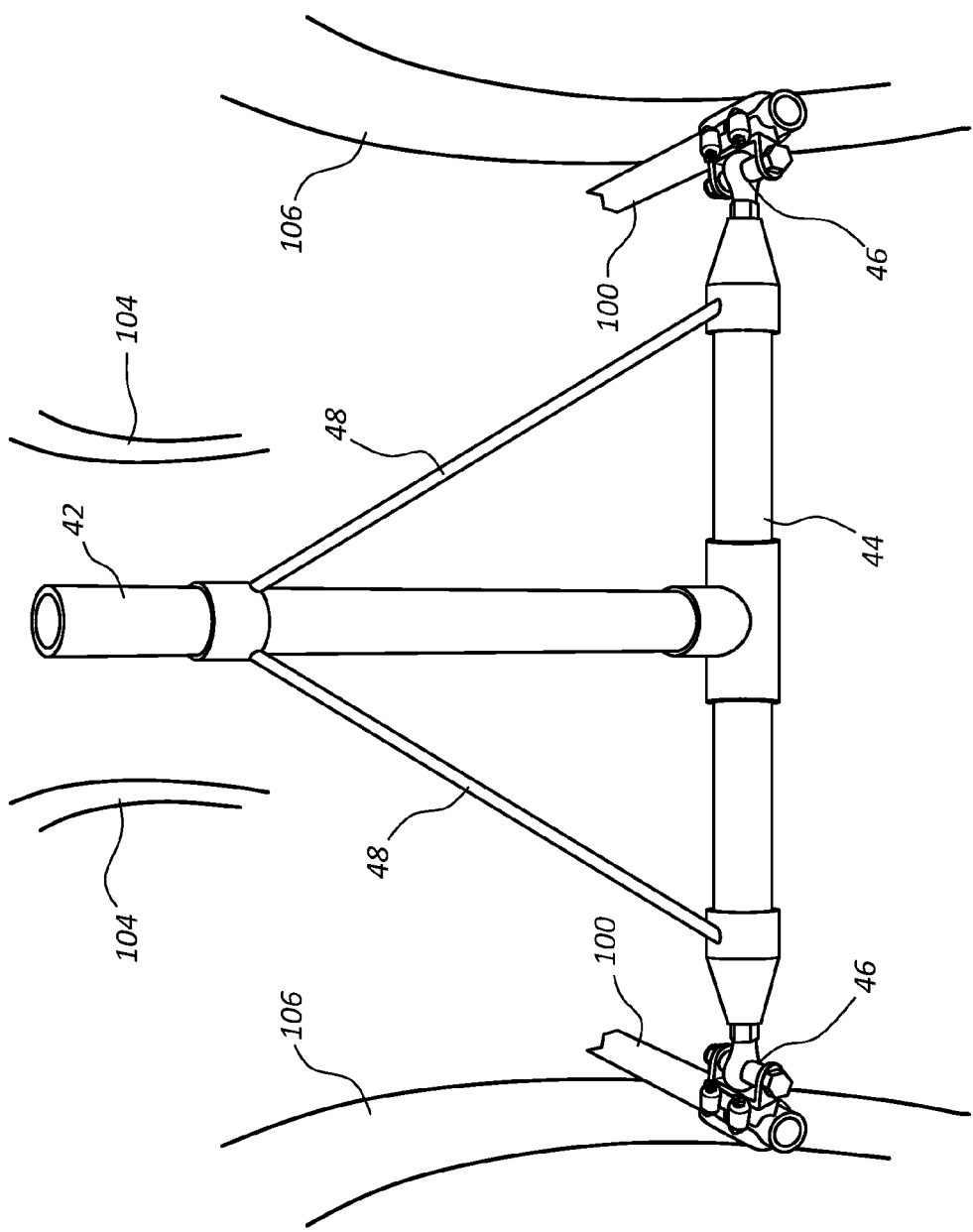
FIG. 5 is a perspective rear view of a rear axle connector of a side-by-side bicycle adapter installed on a pair of bicycles in accordance with a representative embodiment of the present invention.

Referring now to FIGS. 1A-2, a side-by-side bicycle adapter 10 is shown installed on a pair of bicycles 100. Side-by-side bicycle adapter 10 generally comprises three components, namely a steering connection assembly 20, a main connector carriage 30, and a rear axle connector 40. These components are interposedly coupled to the pair of bicycles 100 to link together the bicycles in a side-by-side configuration.

Steering connection assembly 20 attaches to the front forks 102 of bicycles 100, thereby slaving the steering of the bicycles 100. In some embodiments, steering connection assembly 20 comprises a fork adapter 22 comprising a U-channel having a free ends that are fixedly coupled to forks 102. The U-channels extends forward of the forks 102 such that a portion of the front wheel 104 is positioned within the U-channel. A steering arm 24 is attached to fork adapter 22. Steering arm 24 comprises a ball joint 26 that is pivotally coupled to a track rod 28. Track rod 28 comprises a first end coupled to a first ball joint 26 of a first fork adapter 22, and further comprises a second end coupled to a second ball joint 26 of a second fork adapter 22. Track rod 28 further comprises a length that is selected to perfectly align front wheels 104. In some embodiments, track rod 28 further comprises an alignment adjustment, such as a threaded connection between track rod 28 and ball joint 26, thereby permitting finite adjustment of the length of track rod 28.

In some embodiments, steering connection assembly 20 is configured based on Ackermann steering geometry. In particular, steering connection assembly 20 provides a linkage between front wheels 104 that is not a simple parallelogram, but rather the length of the track rod 28 is greater than the distance between the front wheels 104. As such, the steering arms 24 appear to "toe out" as the bicycles 100 turn. Further, the configuration of steering connection assembly 20 causes the inner wheel to turn further than the outer wheel. One having skill in the art will appreciate that the steering connection assembly 20 of the present invention may similarly be designed by placing track rod 28 at a position behind or to the rear of forks 102, provided that the length of track rod 28 be less than the distance between front wheels 104.

Main connector carriage 30 connects bicycles 100 together at the base of the bicycle seats 110 and at the base of the bicycle handle bars 120. In some embodiments, main connector carriage 30 comprises a first connection to the down tube of each bicycle 100, and further comprises a second connection to the seat post of each bicycle 100. Alternatively, main connector carriage 30 may include a connection to the top tube, the seat tube, the head tube and/or the seat stays of bicycles 100.

In some instances, main connector carriage 30 is coupled to bicycles 100 with a plurality of rod end ball joint bearings 32. Bearings 32 permit bicycles 100 to articulate or lean in coordination, such as when steering through a curve with the interconnected bicycles. Further, bearings 32 permit vertical displacement of the interconnected bicycles, such as when one bicycle is positioned on a plane that is higher than a plane on which the other bicycle is positioned. For example, when riding bicycles 100 across a graded plane, one of the interconnected bicycles will be lower than the other bicycle. Bearings 32 permit vertical displacement of the interconnected bicycles thereby allowing each bicycle 100 to maintain an upright position, despite a difference in the respective elevations of the bicycles.

In some embodiments, main connector carriage 30 comprises a forward cross-member 34 coupled to a rearward cross-member 36 via a central support 38. Forward and rearward cross-members 34 and 36 comprise bearings 32 that are configured to clamp onto the downward tubes and seat posts of bicycles 100, respectively. Central support 38 may include any configuration as may be desired to add structural integrity and/or utility to side-by-side bicycle adapter 10. For example, in some embodiments central support 38 comprises a basket for storing item. In other embodiments, central support 38 comprises one or more seats that may be used to transport a passenger, such as a child. Further, in some embodiments central support 38 comprises an upper portion having one or more seats, and comprises a lower portion comprising a self or basket for storage of items.

With reference to FIG. 1C, in some instances main connector carriage 30 further comprises one or more lateral supports 138 which interconnect cross-member 34 to cross-member 36 via joints 141 and 143. Joint 143 typically comprises a rigid, fixed joint, whereby lateral supports 138 are prevented from rotating relative to the fixed position of rear cross-member 36. Joint 141 may also comprise a rigid joint. However, in some instances joint 141 comprises a thrust bearing joint whereby lateral supports 138 are permitted to rotate axially relative to the fixed position of forward cross-member 34 and forward central support 38. As such, joint 141 permits independent up and down movement of the front tire and frame of one bicycle without affecting a stationary position of the other bicycle. In some instances, the front tire and frame of one bicycle is capable of moving upward and downward at least 6-inches without affecting a stationary position of the other bicycle.

Generally, main connector carriage 30 comprises a rigid structure that increases shear strength between the interconnected bicycles (i.e., prevents the position of one bicycle from advancing or retreating relative to the position of the other bicycle). This may be accomplished by any number of structural methods and/or designs. In some embodiments, joints 141 and 143 are constructed to increase shear strength and thereby prevent misalignment of the bicycles relative to one another. In other embodiments, main connector carriage 30 further comprises a decking material comprising a rigid or substantially rigid material to increase the shear strength of the main connector carriage 30. A non-limiting example of such a decking material and structure is provided in FIG. 10, below. In some instances, a thin, rigid decking material is provided that increases shear strength while permitting flexing and twisting of main connector carriage 30. Thus, a flexible main connector carriage may be provided which includes a thrust bearing joint 141 and prevents misalignment of the two interconnected bicycles.

With specific reference to FIG. 1E, in some embodiments fork adapter 122 is configured to attach directly to the brake boss 103 of bicycle 100. In some instances, fork adapter 122 comprises a set of female threads that threadedly receive brake boss 103. In other instances, the standard brake bosses of bicycle 100 are replaced with extended brake bosses 103 to permit attachment of fork adapter 122. Further, in some instances brake boss 103 comprises an adapter (not shown) that couples securely to brake boss 103 and is further configured to receive fork adapter 122 in a fixed and secure manner.

Figure 6A:
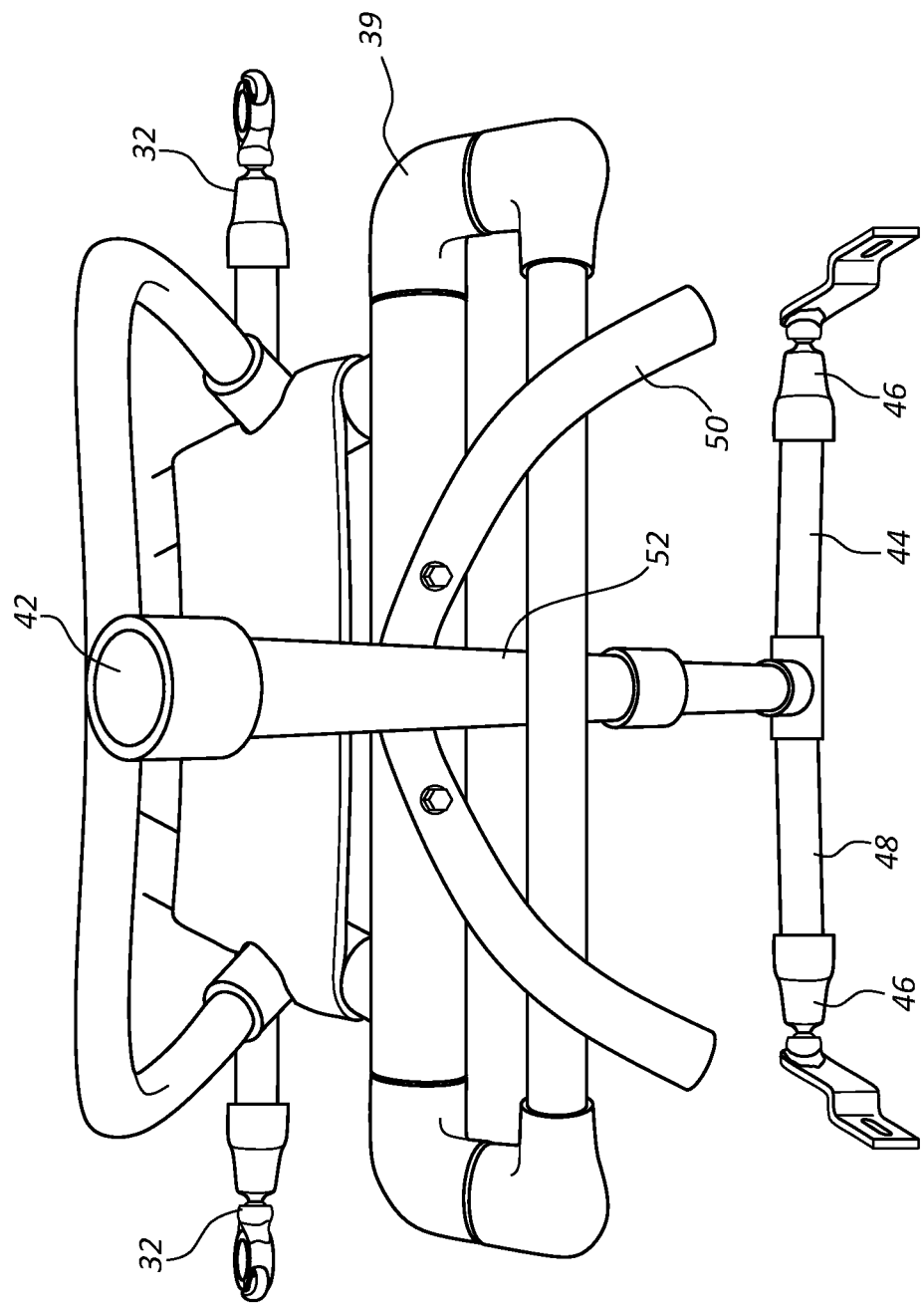
FIG. 6A is a perspective top view of a rear axle connector in a locked position within a limiting box and lock of the main connector carriage of a side-by-side bicycle adapter in accordance with a representative embodiment of the present invention.
Figure 6B:
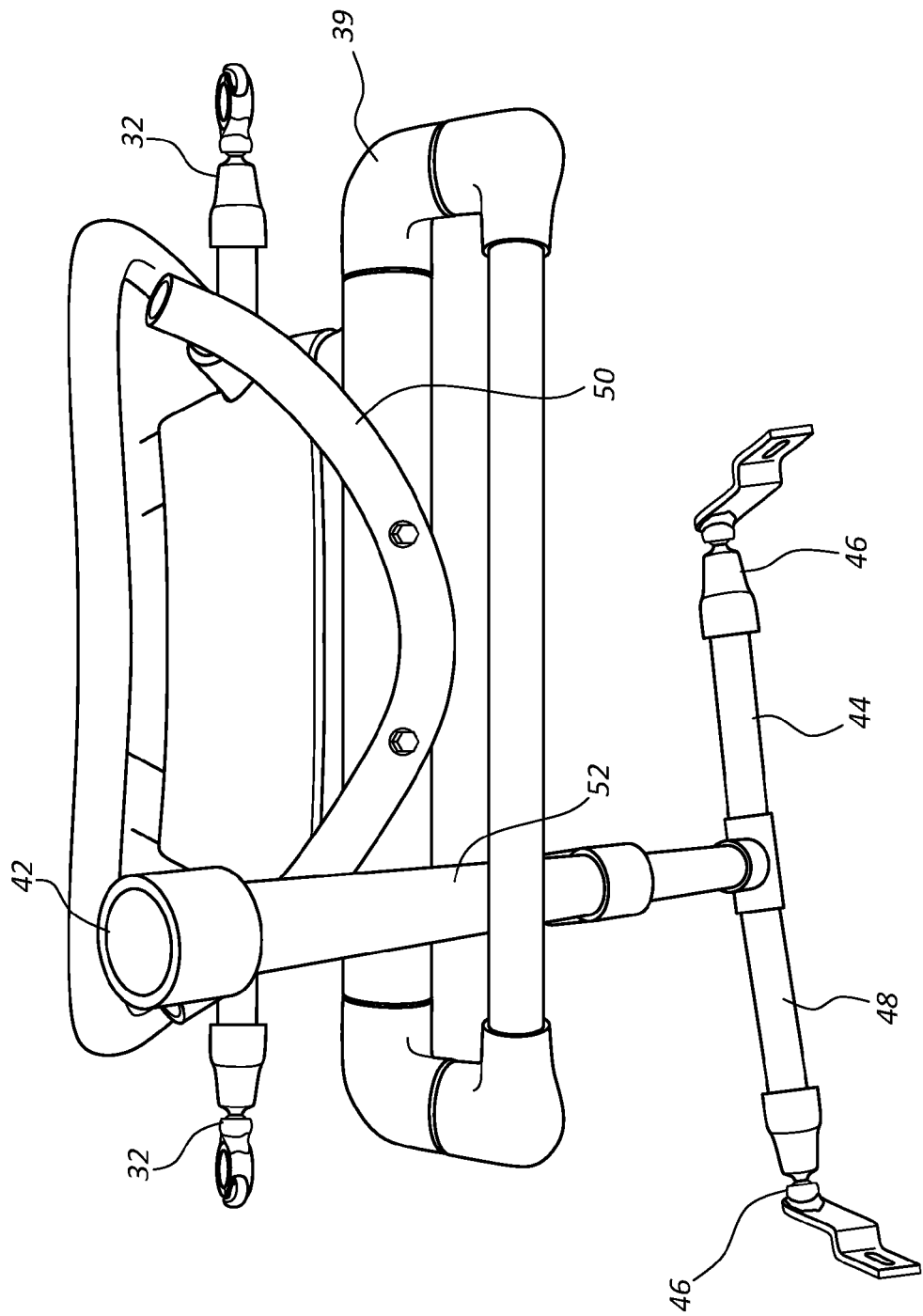
FIG. 6B is a perspective top view of a rear axle connector in an unlocked, articulating position within a limiting box of the main connector carriage of a side-by-side bicycle adapter in accordance with a representative embodiment of the present invention.

Referring now to FIGS. 3-6B, main connector carriage 30 further comprises a limiting box 39 having a channel in which is positioned and retained a vertical pole 42 of rear axle connector 40. Limiting box 39 generally comprises a rectangular hoop having a length that is less than a distance between the interconnected bicycles 100. Limiting box 39 further comprises a hoop opening having a length that is configured to limit articulation or tilting of the interconnected bicycles 100 to a maximum desired angle. Vertical pole 42 moves side-to-side within the hoop of limiting box 39 as the interconnected bicycles 100 are articulated. Contact between vertical pole 42 and a left or right end of the hoop of limiting box 39 prevents further articulation of the interconnected bicycles 100, as shown in FIG. 6B. The hoop of limiting box 39 may further comprise a channel depth that is configured to receive vertical pole 42 with limited tolerance. As such, forward and backward motion of vertical pole 42 within limiting box 39 is minimized.

In some embodiments, limiting box 39 further comprises a lock 50 having a notch 52 centrally positioned along limiting box 39. Notch 52 is configured to engage vertical pole 42 when lock 50 is rotated to capture vertical pole 42 in a central position within limiting box 39, as shown in FIG. 6A. The interaction between lock 50 and vertical pole 42 prevents articulation of interconnected bicycles 100. The locked position may be desirable for storing the interconnected bicycles 100 prior to riding. Alternatively, the locked position may be desirable for preventing articulation during riding for instances where the individuals riding the interconnected bicycles 100 may be unaccustomed to leaning the bicycles 100 into a curve.

Rear axle connector 40 interconnects bicycles 100 near the rear axles. In some embodiments, rear axle connector 40 comprises a cross-member 44 having a rod end ball joint bearing 46 that clamps to the chain stay of each bicycle 100. Cross-member 44 further comprises a vertical pole 42 that is coupled to a central portion of cross-member 44 and extends upwardly therefrom. As discussed above, vertical pole 42 is aligned with, and inserted through a hoop portion of limiting box 39 of main connector carriage 30. In some embodiments, rear axle connector 40 further comprises one or more struts 48 that are connected to cross-member 44 and vertical pole 42 to stabilize the vertical position of vertical pole 42. In some instances, struts 48 comprise tubing. In other embodiments, struts 48 comprise wire supports.

Rod end ball joint bearings 46 are configured to permit articulation of interconnected bicycles 100. Bearings 46 are further configured to permit vertical displacement of the interconnected bicycles 100 relative to one another. In some embodiments, bearings 46 do not permit forward or rearward rotation of cross-member 44 and vertical pole 42 relative to bicycles 100. Rather, bearings 46 only permit upward and downward articulation of bicycles 100. This limited motion is beneficial in preventing racking between the interconnected bicycles 100 that may otherwise occur due to forward or rearward movement of one bicycle relative to the constant position of the other.

Figure 7:
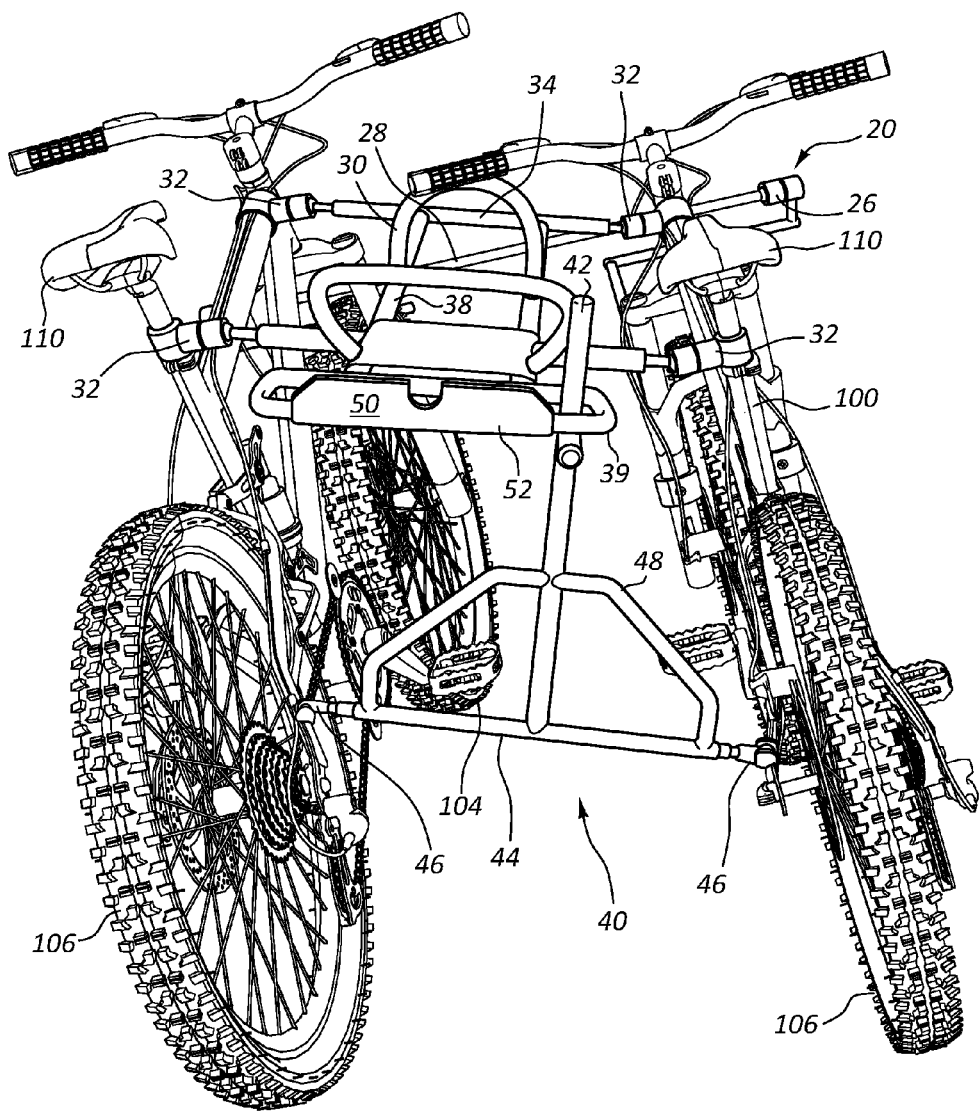
FIG. 7 is a perspective rear view of a side-by-side bicycle adapter in an articulated position in accordance with a representative embodiment of the present invention.
Figure 8:
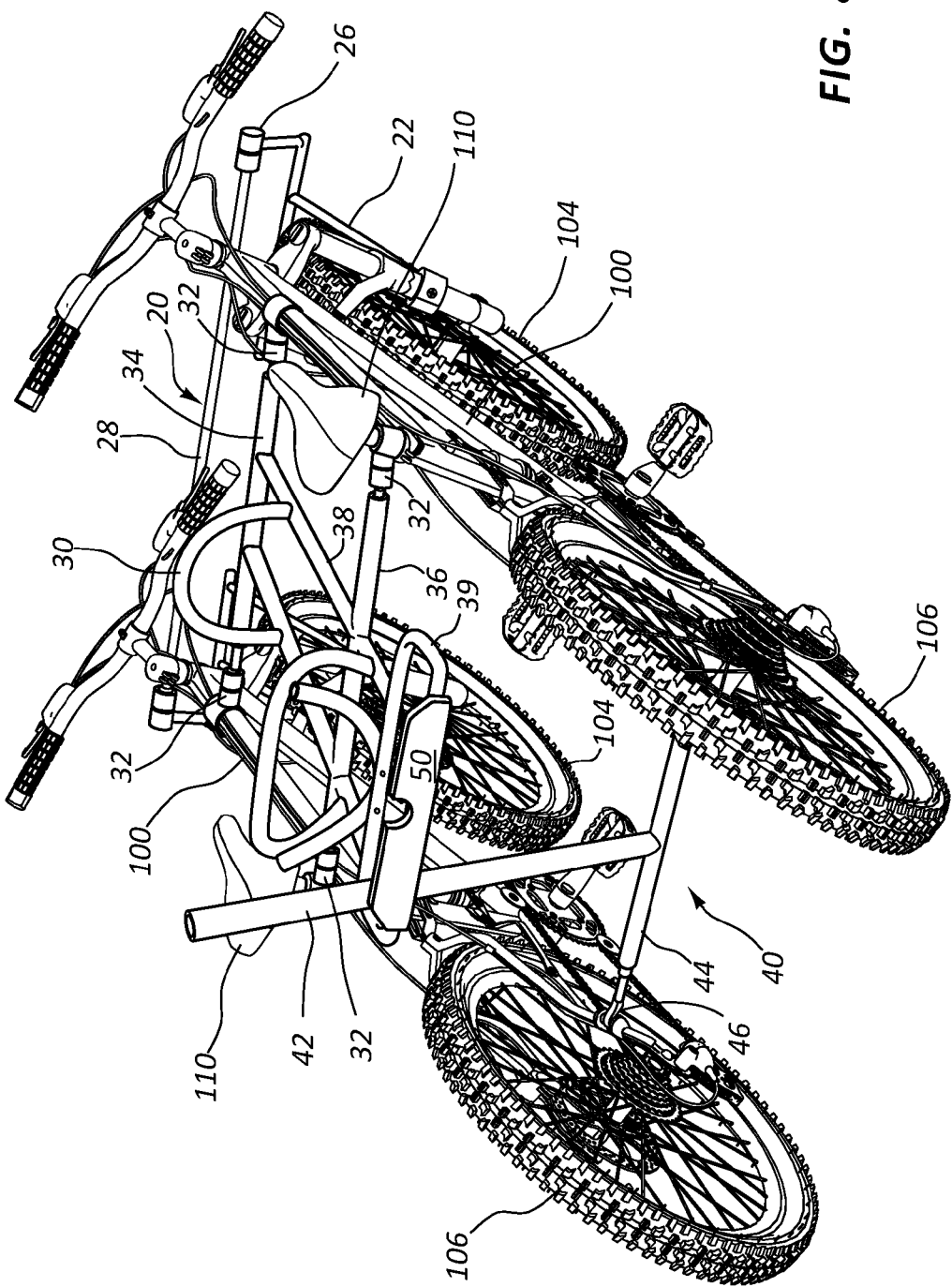
FIG. 8 is a perspective side rear view of a side-by-side bicycle adapter in an articulated position in accordance with a representative embodiment of the present invention.

Referring now to FIGS. 7 and 8, a left and right articulated position of bicycles 100 is shown, respectively. When articulated to the left, vertical pole 42 travels to the right within the hoop of limiting box 39, as shown in FIG. 7. At a maximum right position, interaction between vertical pole 42 and limiting box 39 prevents further articulation of bicycles 100 to the left. When articulated to the right, vertical pole 42 travels to the left within the hoop of limiting box 39, as shown in FIG. 8. At a maximum left position, interaction between vertical pole 42 and limiting box 39 prevents further articulation of bicycles 100 to the right. Accordingly, the length of limiting box 39 determines the maximum left and right articulation of interconnected bicycles 100.

Figure 9A:
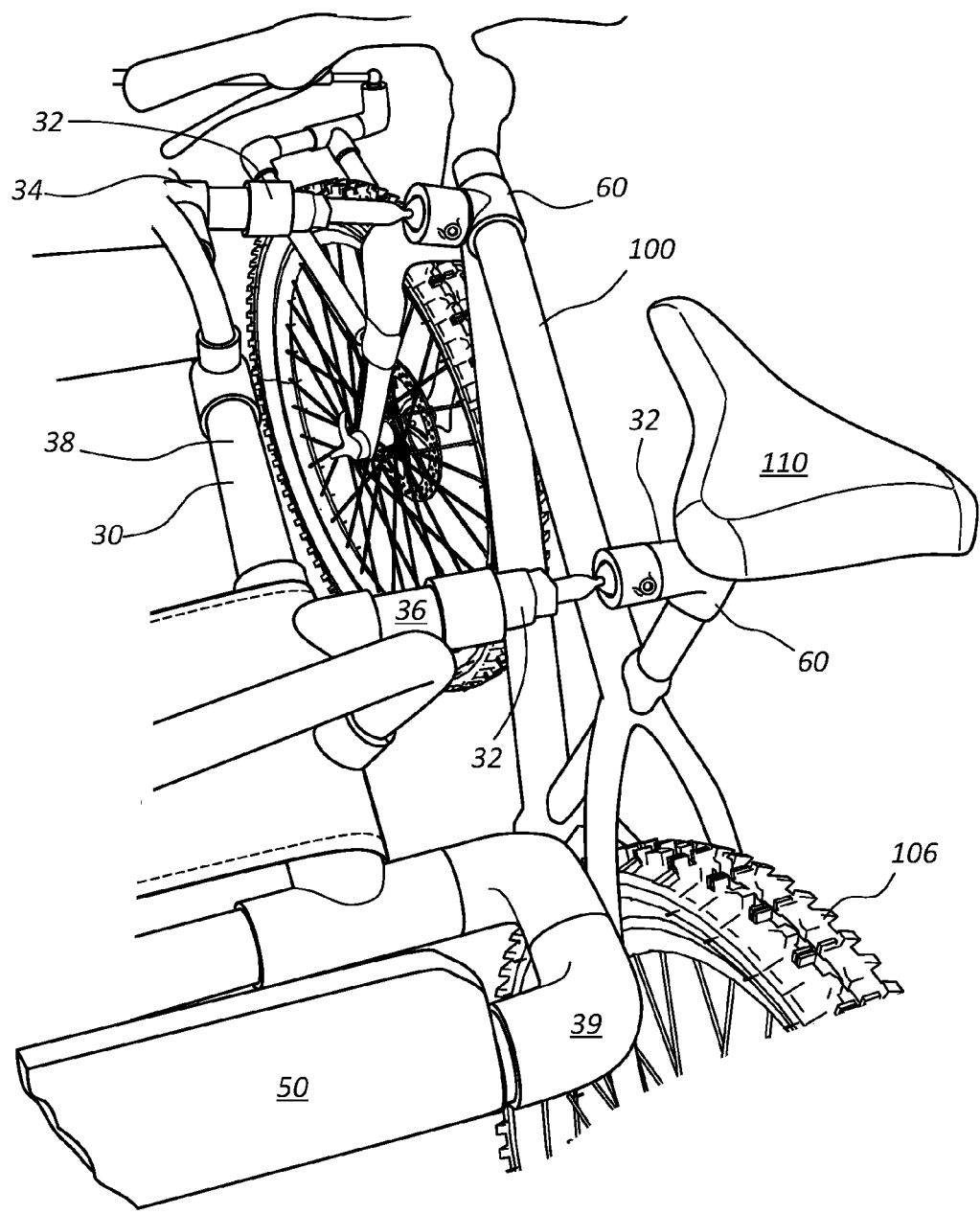
FIG. 9A is a detailed view of a down tube ball joint clamp and a seat post ball joint clamp of the main connector carriage of a side-by-side bicycle adapter installed on a bicycle in accordance with a representative embodiment of the present invention.
Figure 9B:
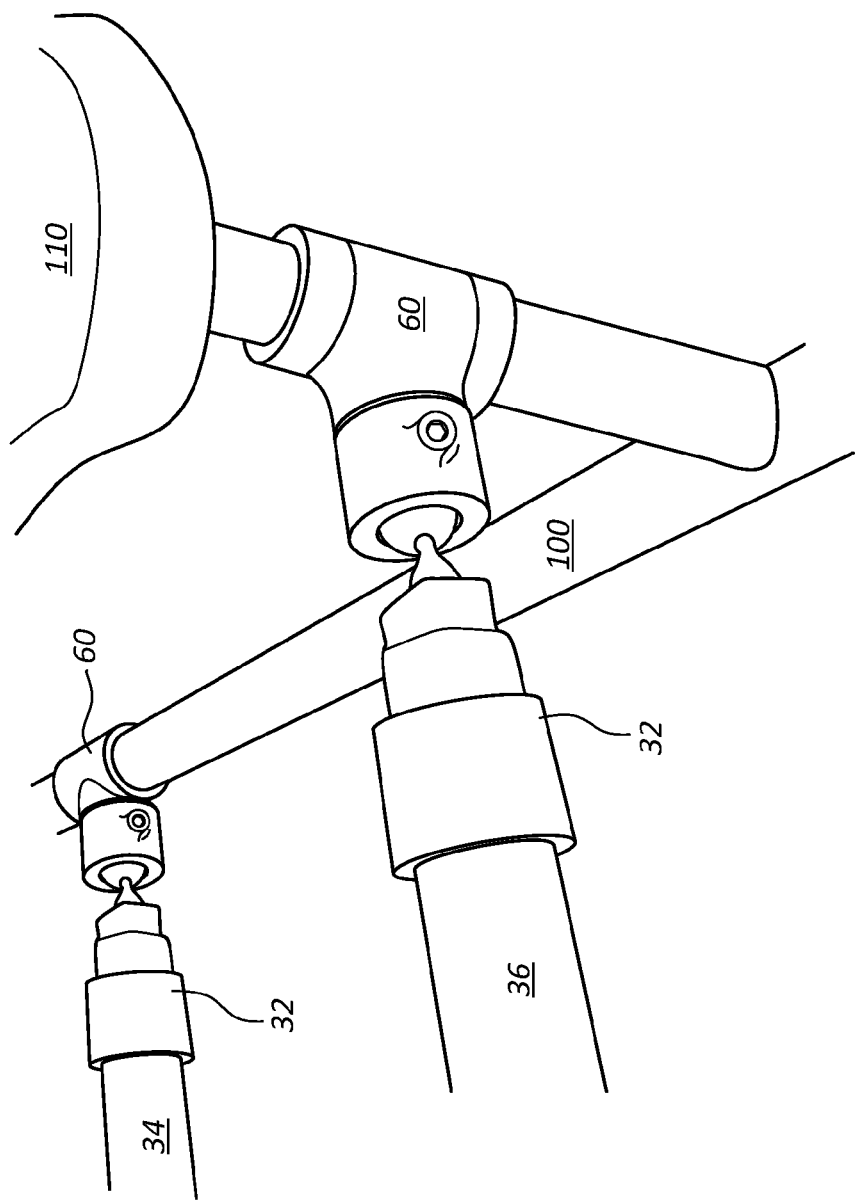
FIG. 9B is a detailed view of a down tube ball joint clamp and a seat post ball joint clamp in accordance with a representative embodiment of the present invention.
Figure 9C:
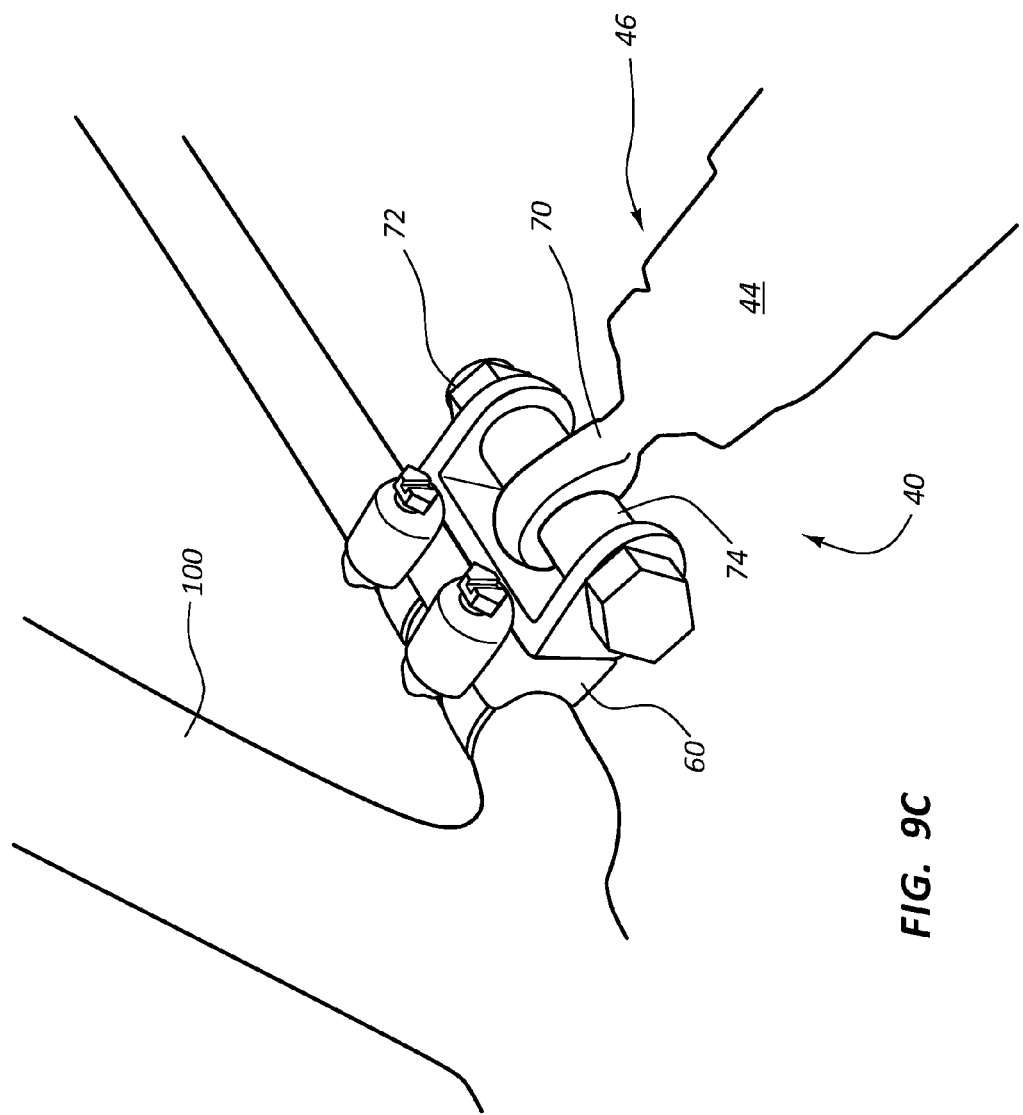
FIG. 9C is a detailed view of a chain stay clamp installed on a bicycle in accordance with a representative embodiment of the present invention.

Referring now to FIGS. 9A-9C, detailed views of various non-limiting examples of ball and/or bearing joint clamps are shown. In some embodiments, a ball joint bearing 32 comprises a clamp portion 60 that is configured to couple bearing 32 to a desired portion of bicycle 100. For example, with reference to FIGS. 9A and 9B, clamp portion 60 may include a two-part clamp that is fitted over a desired surface or portion of bicycle 100, such as a seat post or a top tube. The clamp is secured in place by securing together the two halves of the clamp 60 around the selected portion of the bicycle. In some embodiments, one or more hose clamps are used to secure the position of the clamp 60. Clamp 60 further comprises a socket to receive a ball or bearing 32 that is coupled to main connector carriage 30. The interaction of these components provides a joint that permits articulation of the interconnected bicycles 100.

In some instances, the present invention comprises a system of quick release ball lock pin that allow rapid attachment and removal of bicycles 100 from main connector carriage 30 and the other components of the instant invention. A quick release ball lock pin may comprise a pin having a diameter configured to insert within an aperture of an adapter that forms an attachment point on either the bicycle or the main connector carriage. The quick release ball lock pin may further comprise a tether that is permanently attached to a portion of the main connector carriage or other component in proximity to the aperture configured to receive the pin.

In some embodiments, a bearing connection is provided which limits independent forward and rearward movement of interconnected bicycles 100. Such a bearing connection is shown in FIG. 9C. Rod end ball joint bearings 46 comprises an eyelet 70 that is secured to a clamp 60 via an intersecting bolt 72. Bushings 74 are further provided as spacers to prevent forward and rearward movement of eyelet 70 within clamp 60. The perpendicular orientation of eyelet 70 and bolt 72 permits upward and downward pivoting of bearing 46. Limited tolerance between bolt 72 and eyelet 70, as well as the presence of bushings 74 limit or prevent forward and rearward pivoting or movement of bearing 46.

Figure 10:
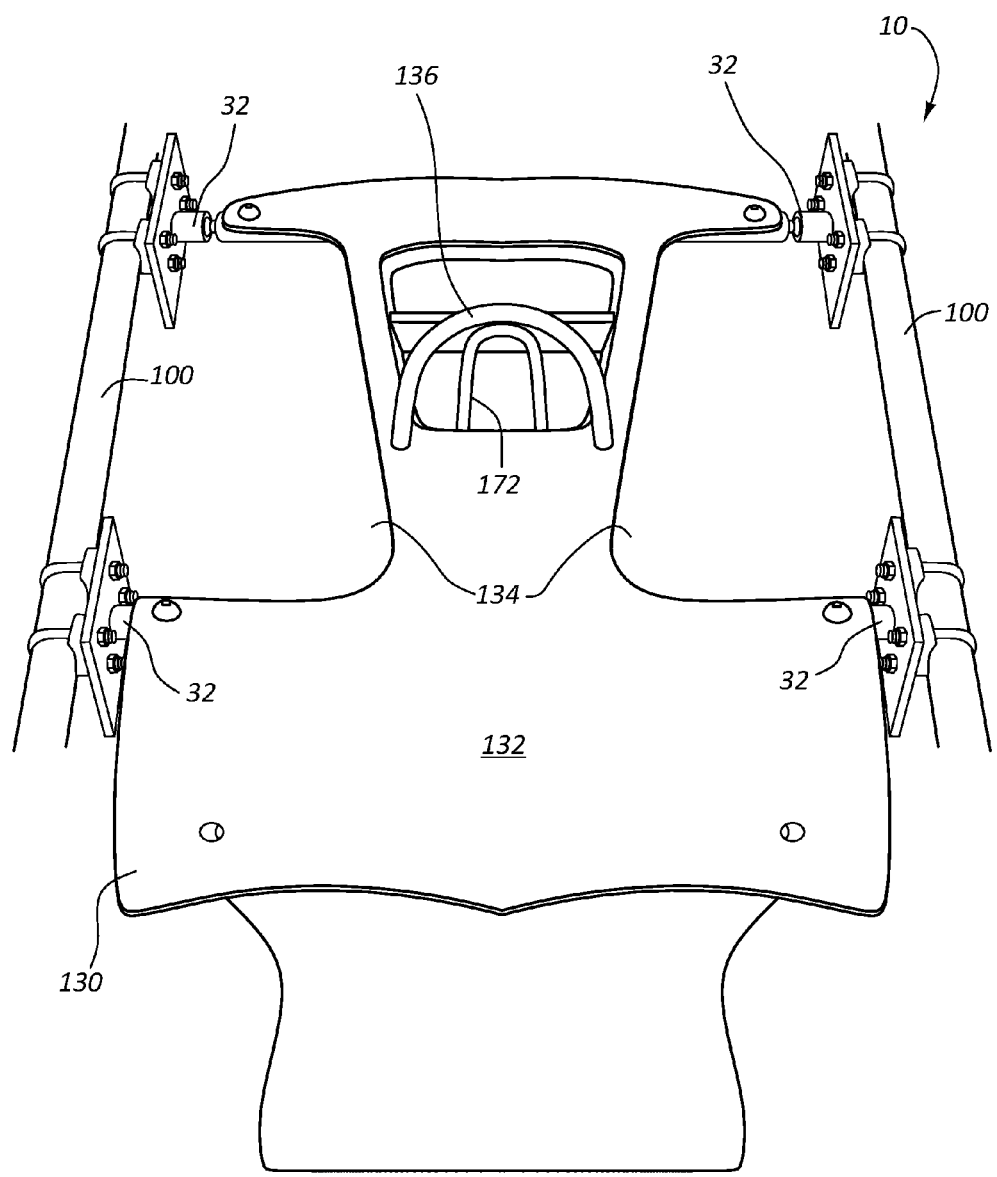
FIG. 10 is a perspective top and rear view of a side-by-side bicycle adapter installed on a pair of bicycles in accordance with a representative embodiment of the present invention.

Referring now to FIG. 10, an alternative embodiment of main connector carriage 130 is shown. In some embodiments, main connector carriage 130 comprises a body or decking 132 that is coupled to, and covers the various structural components of side-by-side bicycle adapter 10. In some instances, decking 132 comprises a rigid material that is compatible for use with bicycles 100 and prevents misalignment of the bicycles relative to one another (i.e, prevents one bicycle from advancing or retreating relative to the position of the other bicycle). For example, decking 132 may comprise a material selected from wood, plastic, fiberglass, carbon fiber, aluminum, steel, and/or combinations thereof. In some embodiments, decking 132 further comprises a cut-out 134 configured to accommodate the user's leg when riding bicycles 100. In some instance, decking 132 further include a handle 136 that may be used to carry bicycle adapter 10. Handle 136 may also be used by a passenger or a rider to steady their position while sitting on decking 132.

Figure 11:
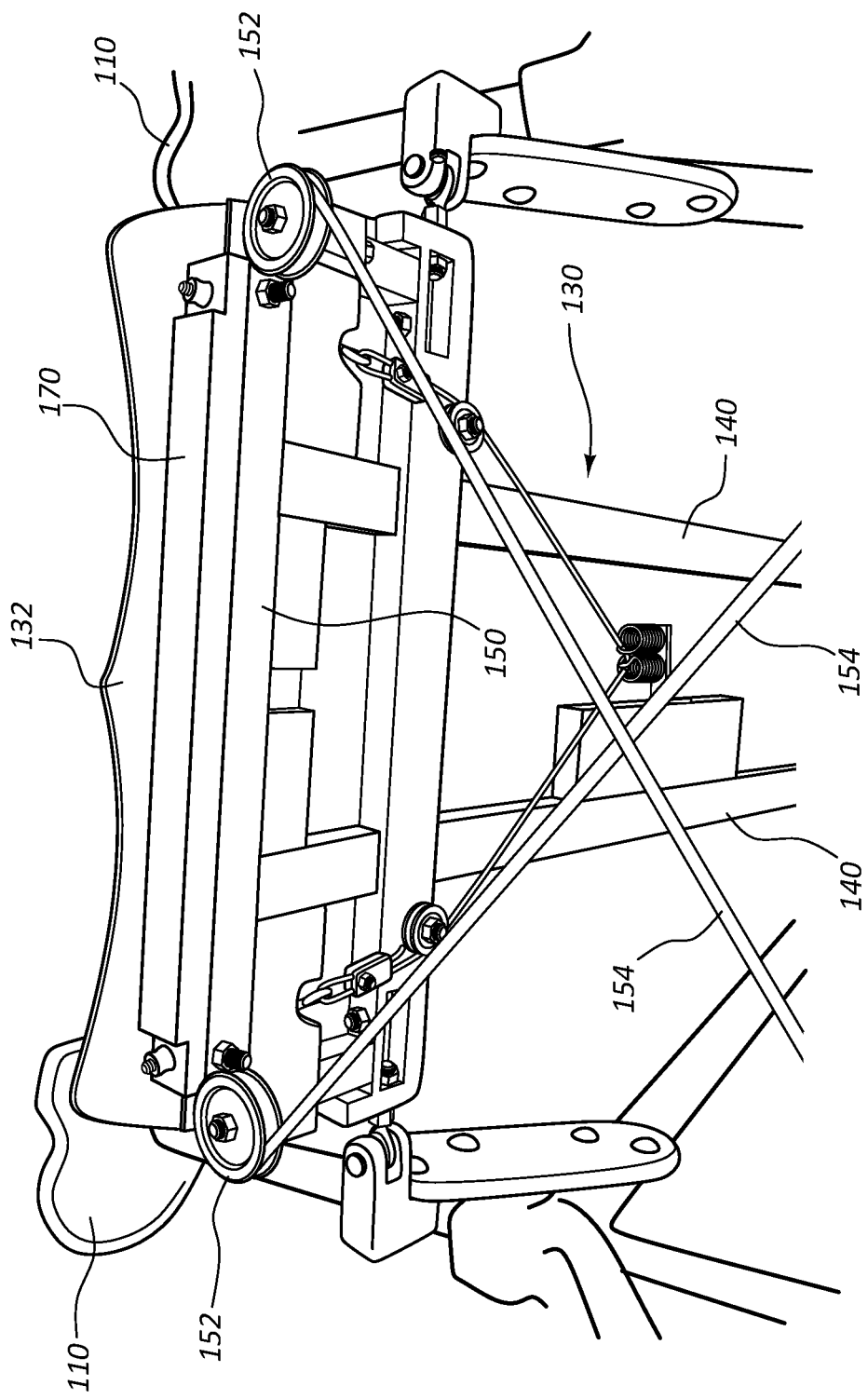
FIG. 11 is a perspective underside view of a side-by-side bicycle adapter installed on a pair of bicycles in accordance with a representative embodiment of the present invention.

In some embodiments, main connector carriage 130 further comprises a tilting mechanism and a braking system, as shown in FIGS. 11-14B. Referring now to FIG. 11, in some embodiments main connector carriage 130 comprises a chassis 140 which is attached to bicycles 100 and on which the various components of bicycle adapter 10 are attached and coordinated. Chassis 140 may comprise any compatible material. For example, in some embodiments chassis 140 comprises a material selected from wood, metal, and/or composite materials, and combinations thereof. Generally, chassis 140 comprises various connections points having means for coupling to bicycles 100 in accordance with the previous discussion.

In some embodiments, main connector carriage 130 comprises a tilting mechanism 150 which includes a system of pulleys 152 and corded cables 154 to permit controlled tilting of bicycles 100. Main connector carriage 130 further comprises a braking system 170 which is configured to selectively arrest movement of tilting mechanism 150.

Figure 12:
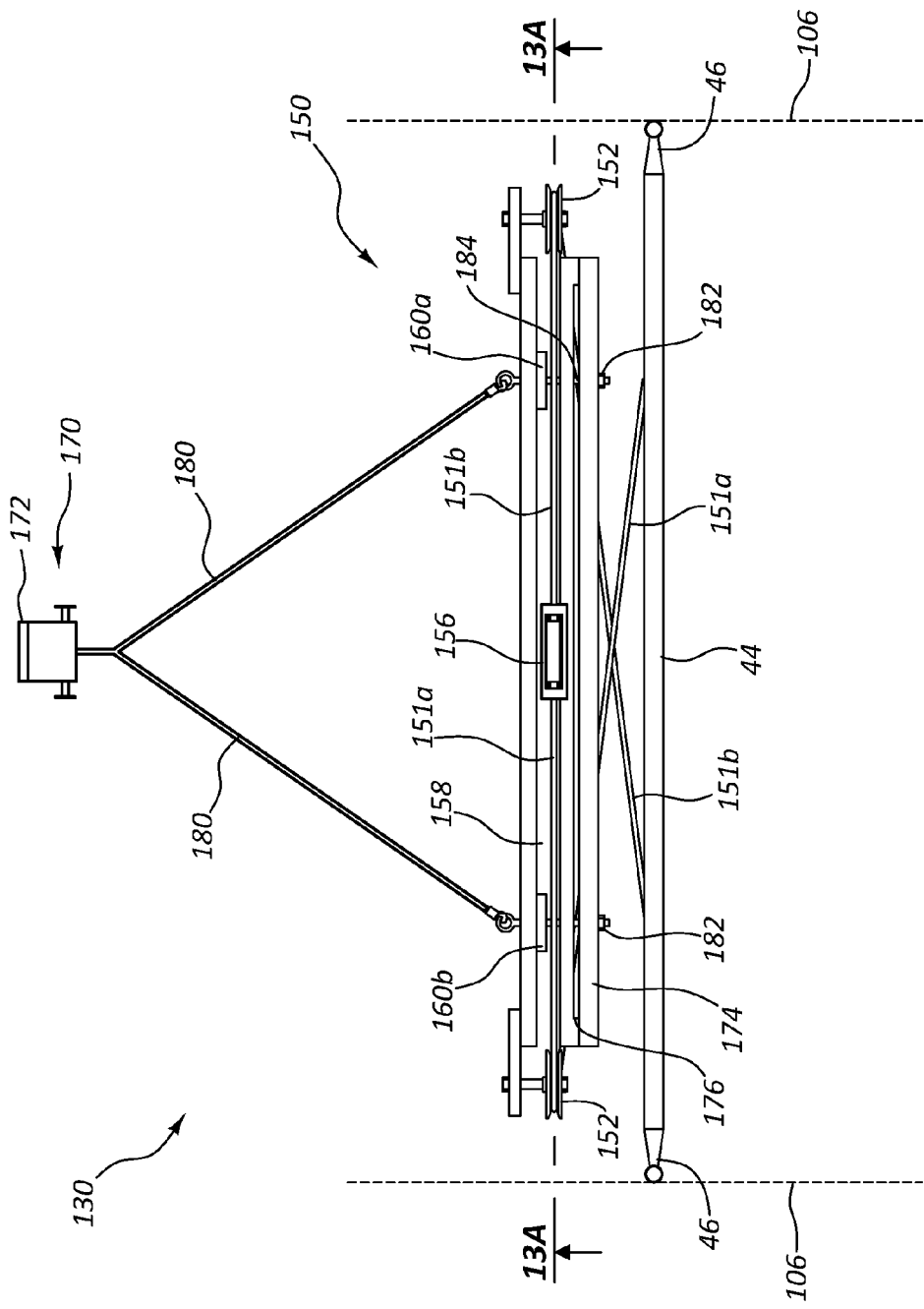
FIG. 12 is a plan top view of a tilting mechanism and braking system of main connector carriage and rear axle connector in accordance with a representative embodiment of the present invention.

Referring now to FIG. 12, a top plan view of a tilting mechanism 150 and braking system 170 of a main carriage is shown. In some embodiments, tilting mechanism 150 comprises a shuttle 156 that is slidably positioned in a channel 158. In some embodiments, channel 158 comprises a C-channel. In other embodiments, channel 158 comprises an L-channel. Channel 158 further comprises a right stop block 160a and a left stop block 160b. Right and left stop blocks 160a and 160b limit left and right movement of shuttle 156 in channel 158. Stop blocks 160a and 160b are configured to prevent shuttle 156 from bypassing the position of the stop blocks in channel 158. Thus, shuttle 156 may freely move within channel 158 at all positions between stop blocks 160a and 160b.

Tilting mechanism 150 further comprises a first corded cable 151a that is attached to a first side of shuttle 156 and is further attached to cross-member 44 at a position opposite the first side of shuttle 156. A second corded cable 151b is attached to a second side of shuttle 156 and is further attached to cross-member 44 at a position opposite the second side of shuttle 156, and opposite the attachment point of first corded cable 151a to cross-member 44. Accordingly, first and second corded cables 151a and 151b crossover at a point between cross-member 44 and channel 158, as shown. In some embodiments, first and second corded cables 151a and 151b pass over pulleys 152 to permit easy movement of shuttle 156 within channel 158.

In some instances, main connector carriage 130 further comprises a braking system 170 that is configured to selectively arrest movement of shuttle 156 in channel 158. In some embodiments braking system 170 comprises a brake lever 172 that is pivotally coupled to chassis 140, as shown in FIGS. 10-12, 14A and 14B. Brake lever 172 is coupled to brake caliper 174 via a system of brake cables 180 and brake pins 182. Brake caliper 174 further comprises a brake pad 176 that is positioned between brake caliper 174 and shuttle 156.

In some embodiments, brake pins 182 extend through channel 158 and are secured to brake caliper 174. Brake pins 182 may further be inserted through tension springs 184 that are interposed between channel 158 and brake caliper 174. Tension springs 184 are configured to bias brake caliper 174 away from shuttle 156 when brake lever 172 is in an inactivated position. Upon moving brake lever 172 to an activated position, tension springs 184 are compressed and brake pad 176 contacts shuttle 156 to arrest movement of shuttle 156 in channel 158. Further discussion of braking system 170 is provided in connection with FIGS. 14A and 14B, below.

Figure 13A:
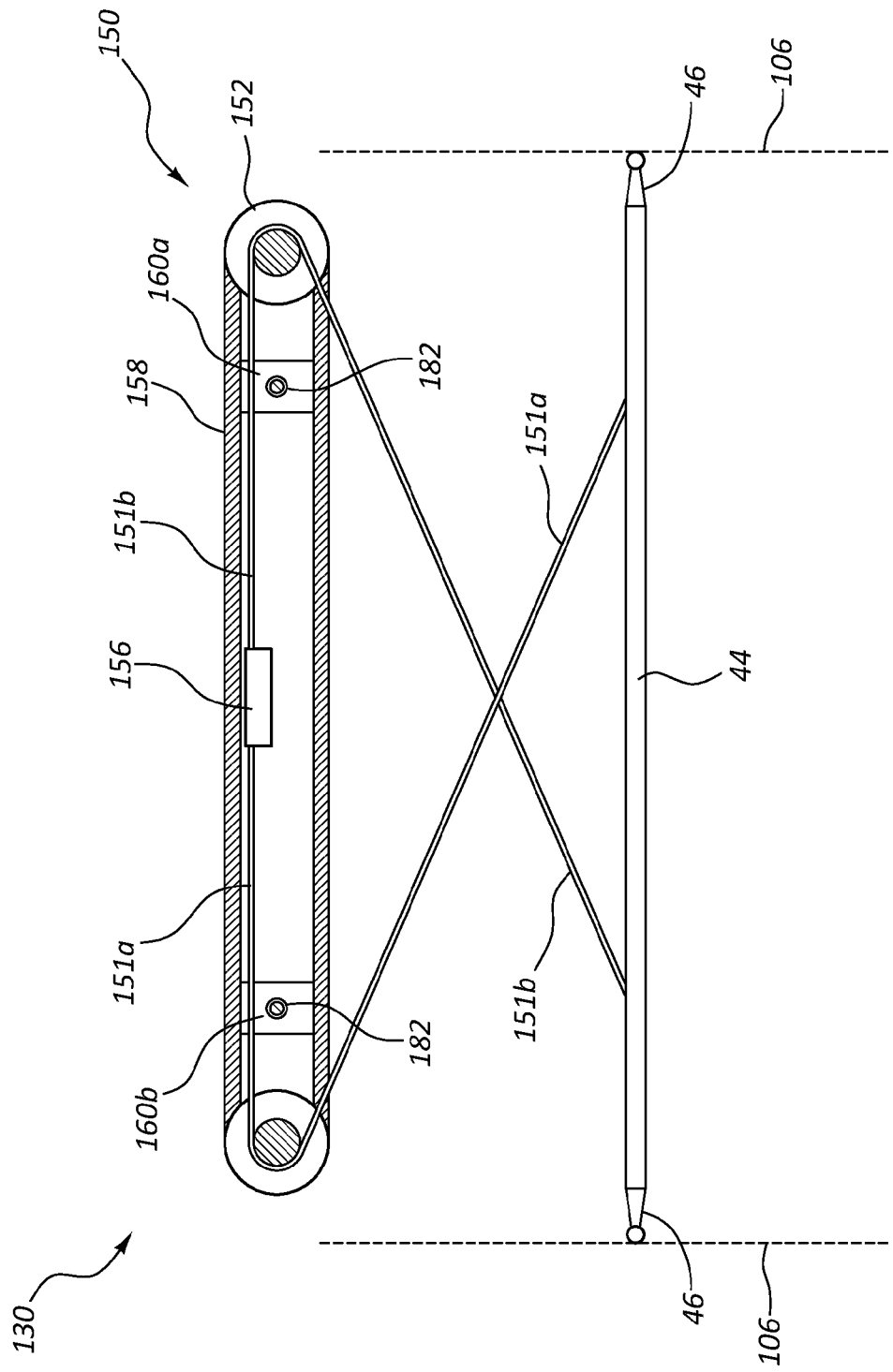
FIG. 13, shown in parts A-C, is a cross-section rear view of the tilting mechanism of the main carriage and rear axle connector at various positions in accordance with representative embodiments of the present invention.
Figure 13B:
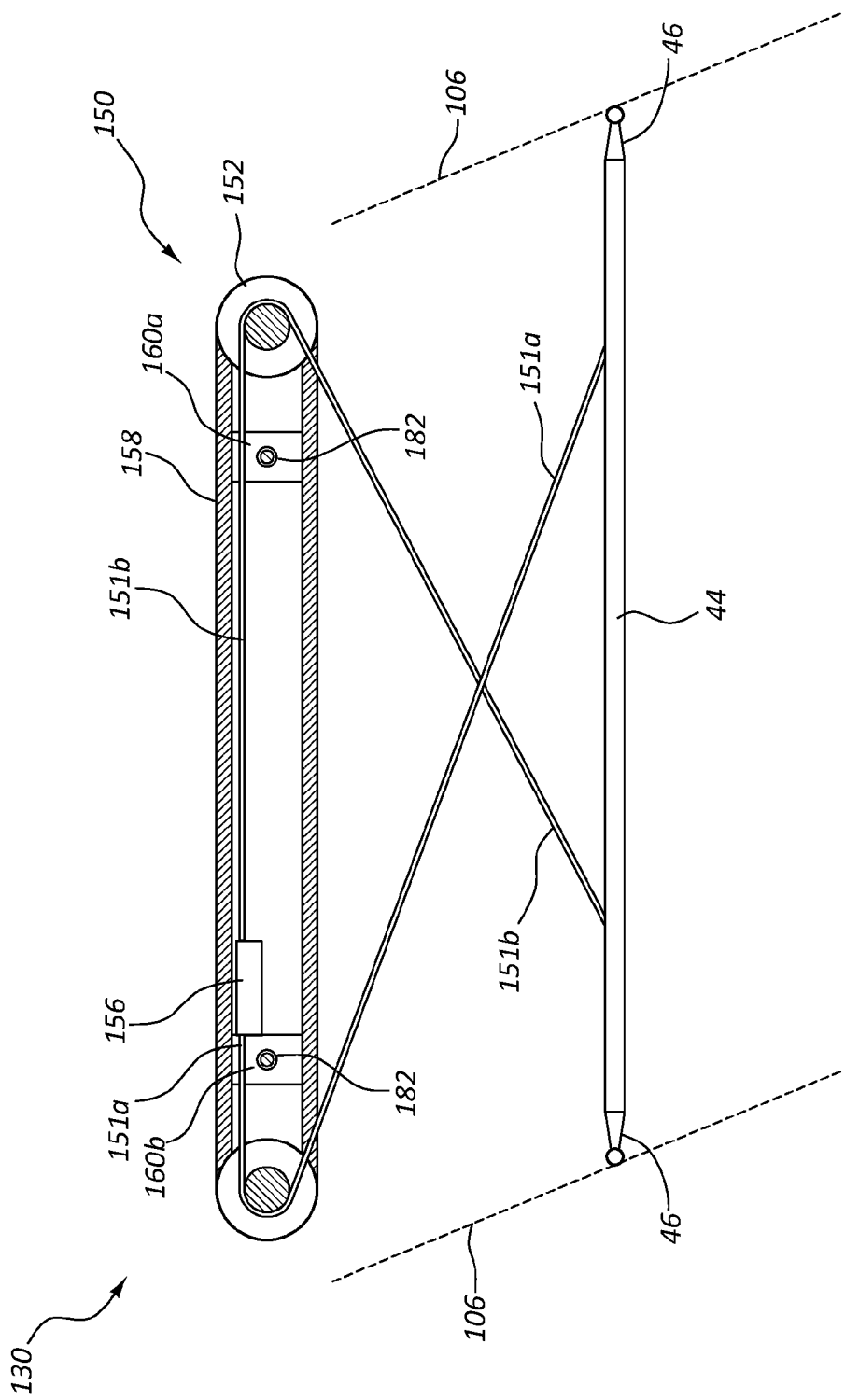
Figure 13C:
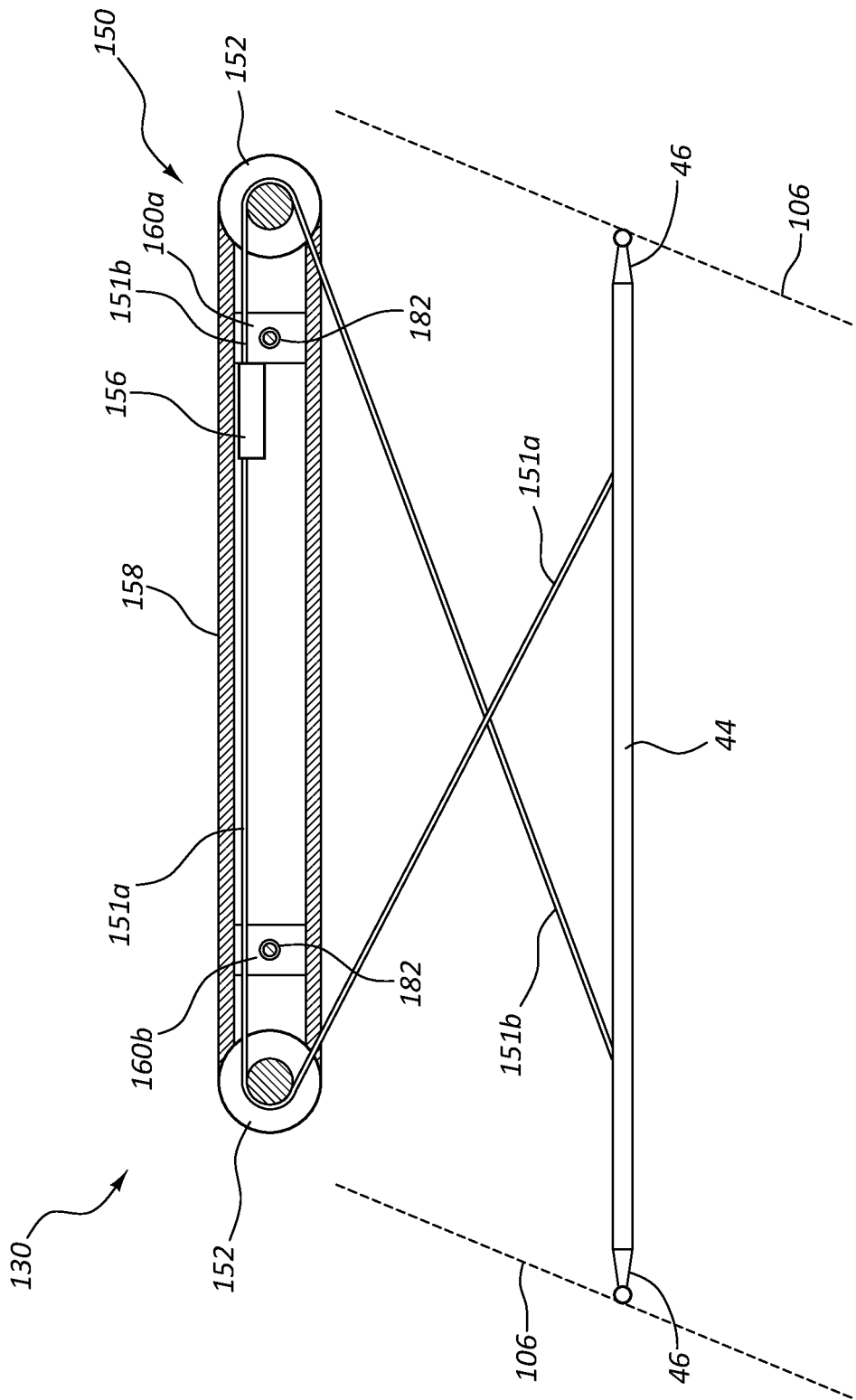

Referring now to FIGS. 13A-13C, tilting mechanism 150 is shown at various tilted positions. FIG. 13A shows tilting mechanism 150 at a neutral position. Dashed lines are provided to represent the plane of wheels 106 which are attached to cross-member 44 when installed on a pair of bicycles.

In the neutral position, shuttle 156 is generally centered in channel 158 between stop blocks 160a and 160b. Corded cables 151a and 151b extend outwardly from shuttle 156 and over their respective pulleys 152. Corded cables 151a and 151b then crisscross below channel 158 and attach to cross-member 44, as discussed above.

As the plane of wheels 106 tilts to the left, shuttle 156 slides within channel 158 to the left. A maximum left-tilted position is achieved when shuttle 156 contacts stop block 160b. As shuttle 156 slides to the left, corded cable 151b is drawn into channel 158 and corded cable 151a is released from channel 158, as shown in FIG. 13B. Conversely, as shuttle 156 slides to the right, corded cable 151a is drawn into channel 158 and corded cable 151b is release from channel 158, as shown in FIG. 13C.

Figure 14A:
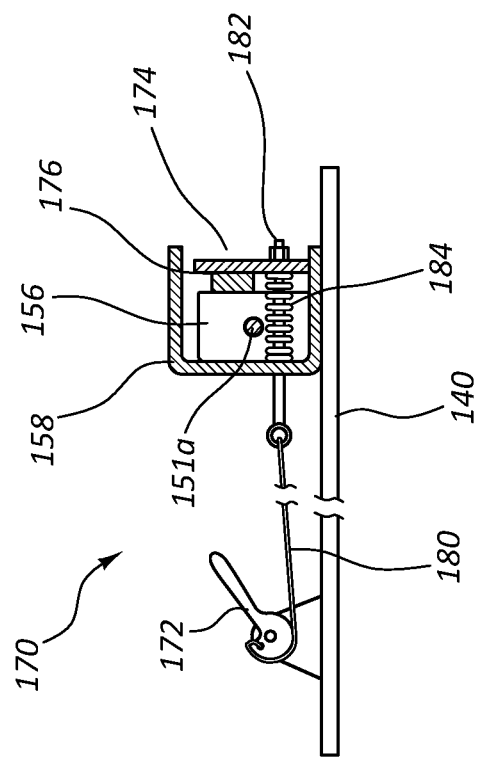
FIG. 14A is a cross-section side view of a locking assembly for a tilting mechanism of a main carriage in an unlocked configuration in accordance with a representative embodiment of the present invention.
Figure 14B:
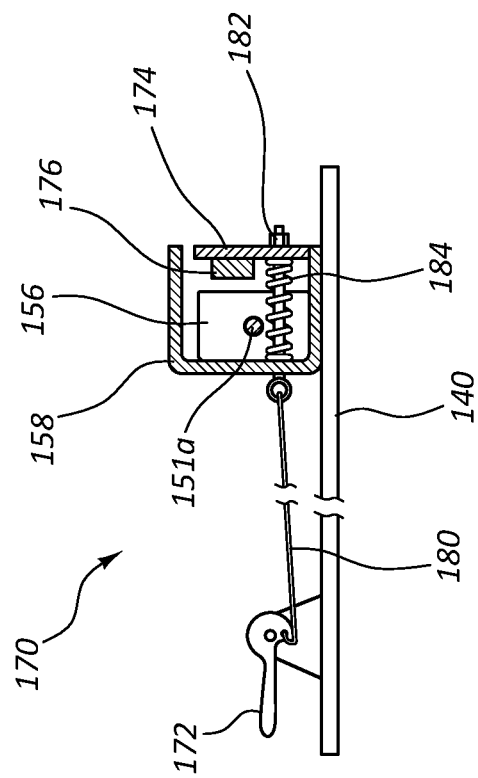
FIG. 14B is a cross-section side view of a locking assembly for a tilting mechanism of a main carriage in a locked configuration in accordance with a representative embodiment of the present invention.
Figure 15:
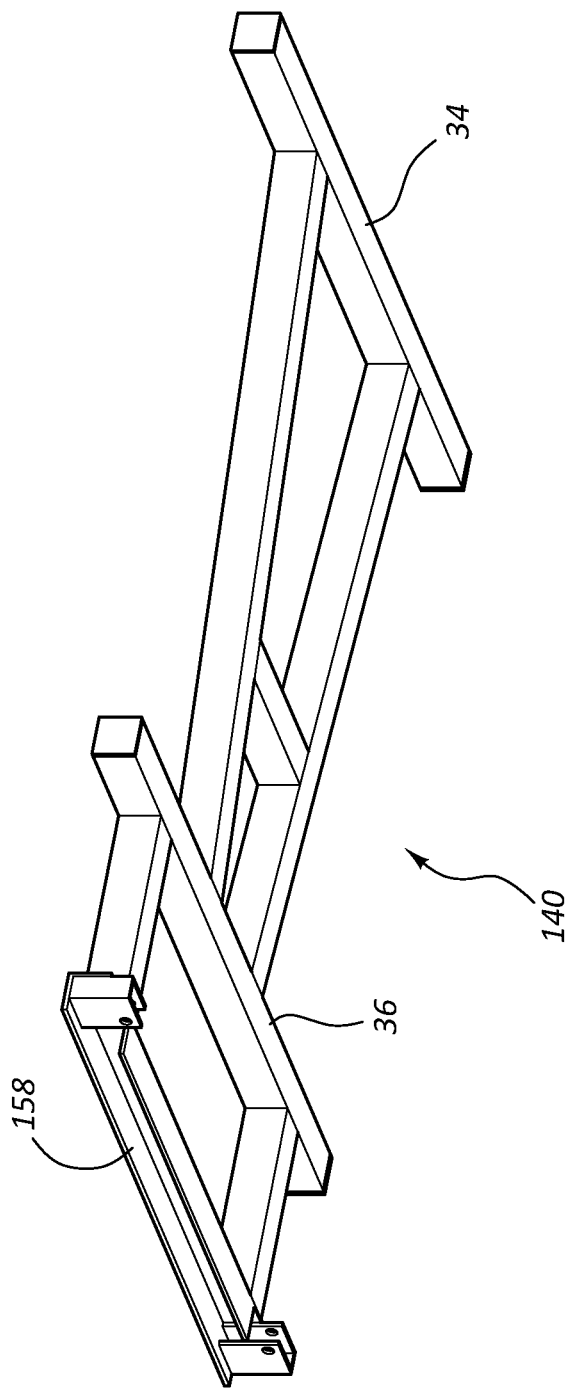
FIG. 15 is a perspective bottom and side view of a side-by-side bicycle adapter chassis in accordance with a representative embodiment of the present invention.

Referring now to FIGS. 14A and 14B, locking system 170 is shown in both unlocked and locked configurations. Generally, locking system 170 is configured to arrest movement of shuttle 156 at any desired position within channel 158. In some embodiments, locking system 170 comprises a brake caliper 174 having a brake pad 176 that contacts and pinches shuttle 156 between brake pad 176 and channel 158. In some embodiments, brake caliper 174 and brake pad 176 comprise a length approximately equal to the length of channel 158.

Referring specifically to FIG. 14A, locking system 170 is shown in an unlocked configuration. Upon moving brake lever 172 to a locked position, brake cable 180 pulls brake pin 184 and brake caliper 174 inwardly so that brake pad 176 contacts shuttle 156, as shown in FIG. 14B. In the locked configuration, tension spring 184 is compressed. Upon releasing or moving brake lever 172 to an unlocked position, potential energy stored in tension spring 184 is released and brake caliper 174 is returned to an unlocked position, as shown in FIG. 14A.

Figure 16A:
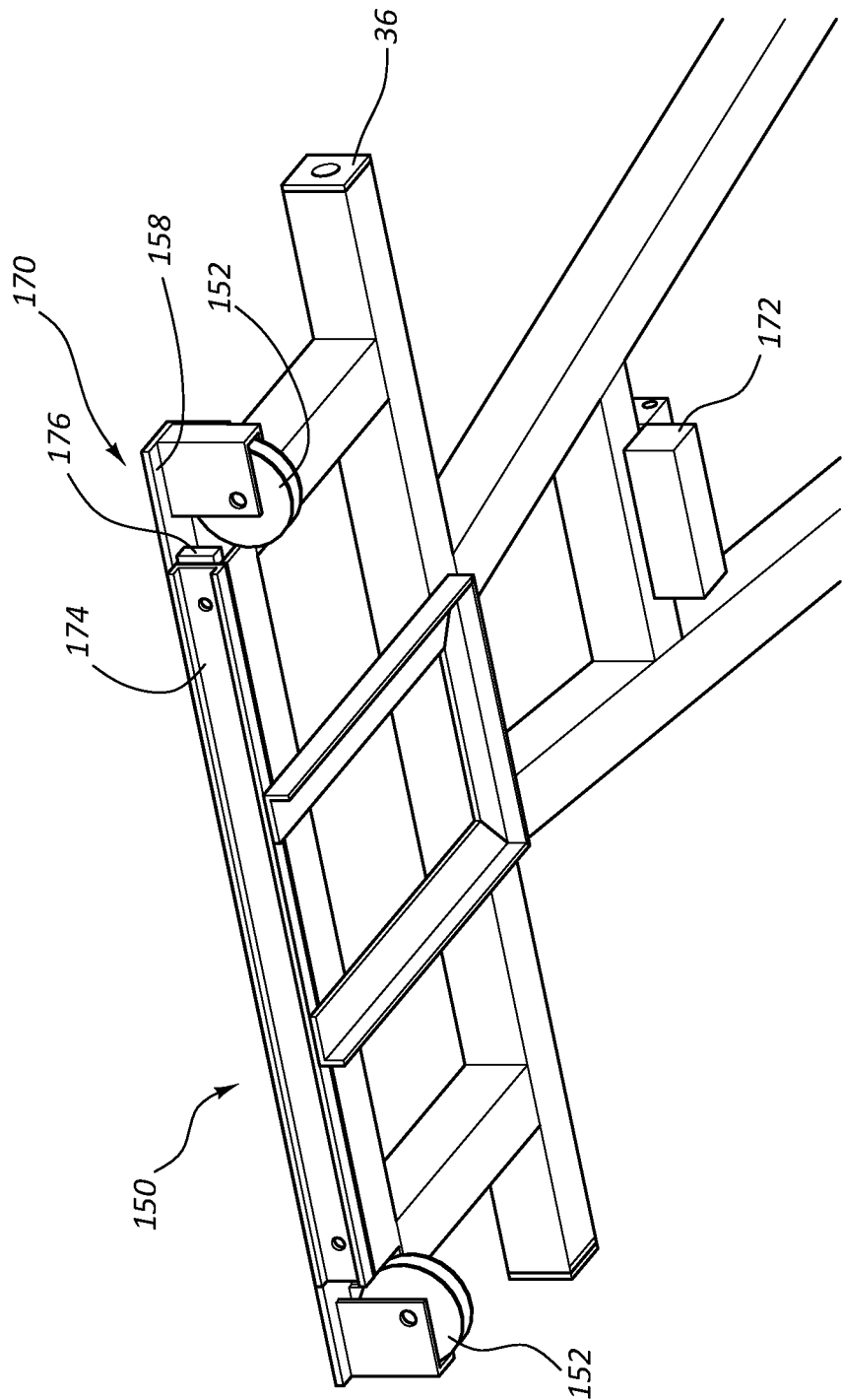
FIG. 16, shown in parts A-C, shows various perspective views of a partially assembled side-by-side bicycle adapter in accordance with various representative embodiments of the present invention
Figure 16B:
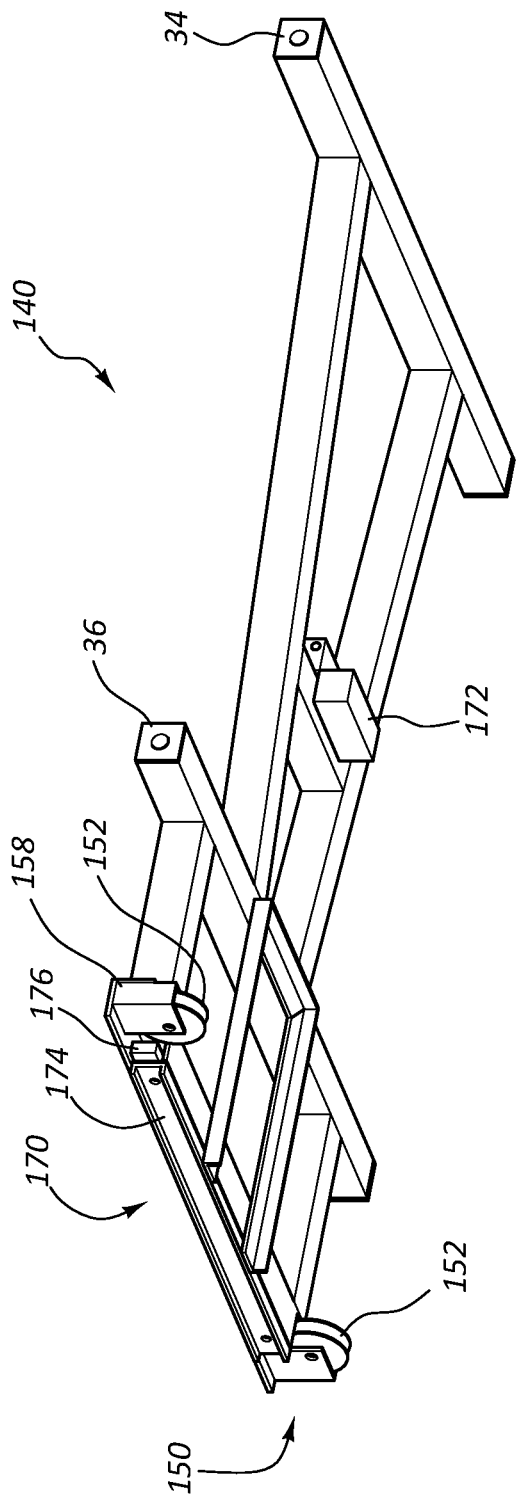
Figure 16C:
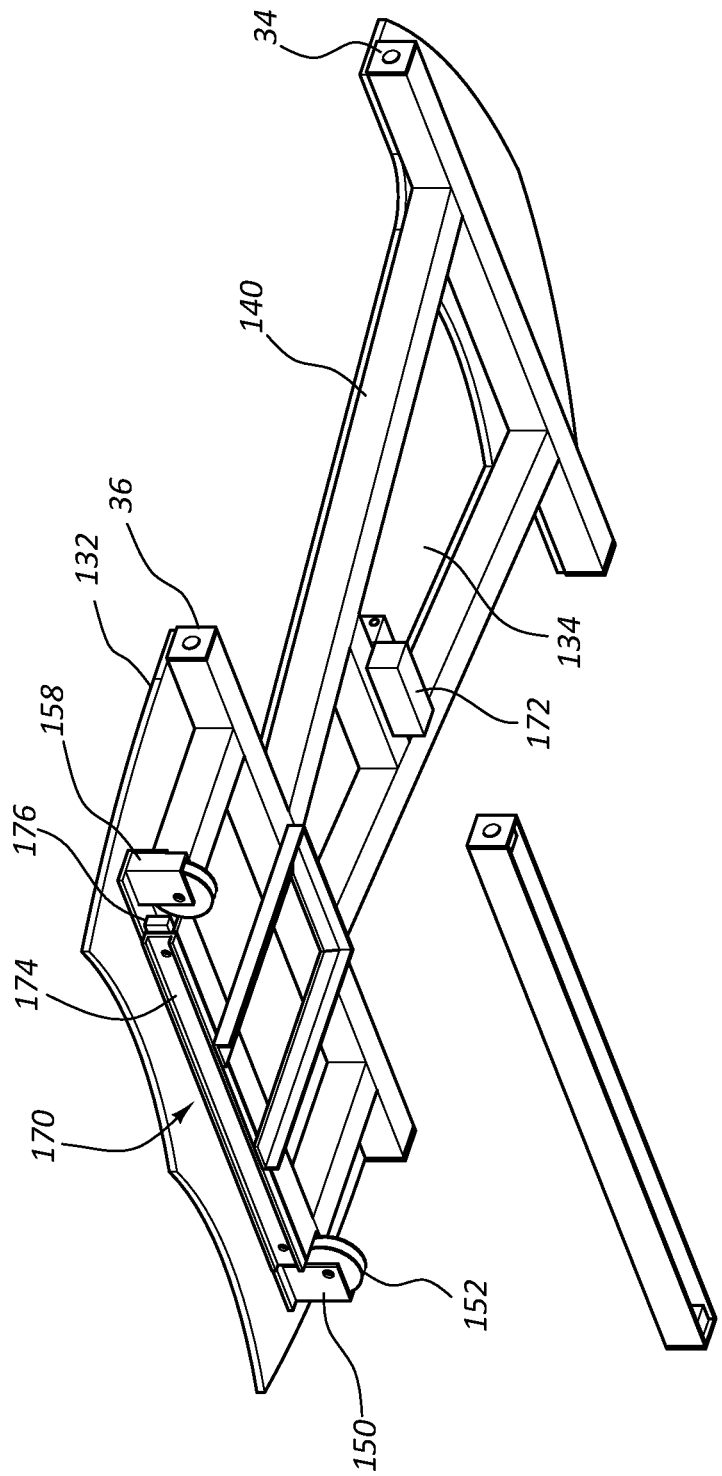

Referring now to FIGS. 16A-16C, various perspective views of a partially assembled chassis 140, tilting mechanism 150 and braking system 170 are shown.

Figure 18:
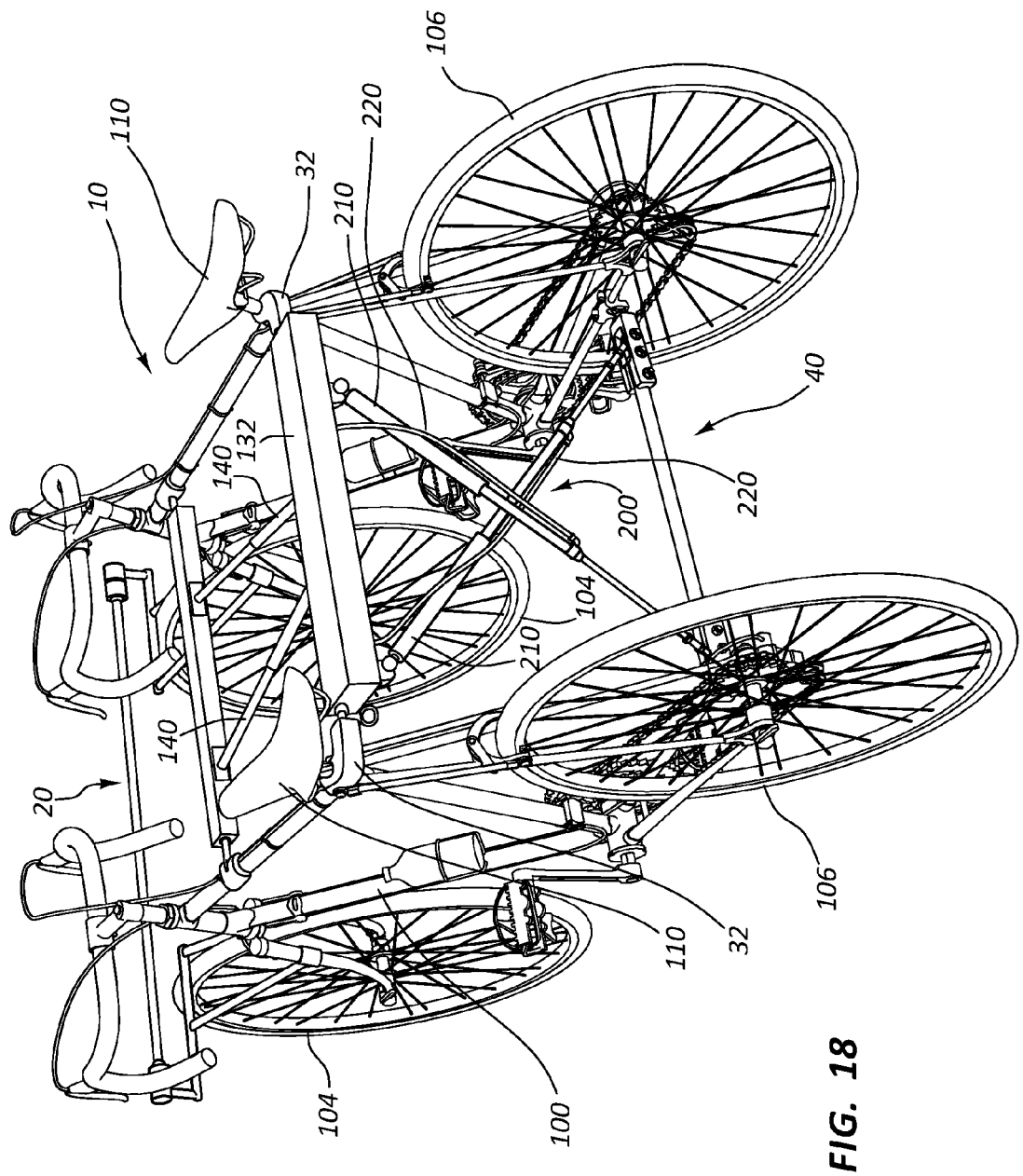
FIG. 18 is a perspective view of a side-by-side bicycle adapter with a hydraulic tilting mechanism in accordance with various representative embodiments of the present invention.

In some embodiments, main connector carriage 130 further comprises a hydraulic tilting mechanism and a hydraulic locking system, as shown in FIGS. 17-21B. Referring now to FIGS. 17 and 18, in some embodiments main connector carriage 130 comprises a chassis 140 which is attached to and interconnects bicycles 100. Chassis 140 further comprises various surfaces and structures on which the various components of bicycle adapter 10 are attached and coordinated.

In some embodiments, main connector carriage 130 comprises a hydraulic tilting mechanism 200 which includes hydraulic cylinders 210, a system of hosing connectors, couplers and hydraulic hoses 220, and a system of dampening reservoirs 230. These components are provided to permit controlled tilting of bicycles 100. Main connector carriage 130 further comprises a hydraulic locking system 240 which is configured to selectively arrest movement of hydraulic tilting mechanism 200 to provide a desired tilt angle for bicycles 100.

Figure 19A:
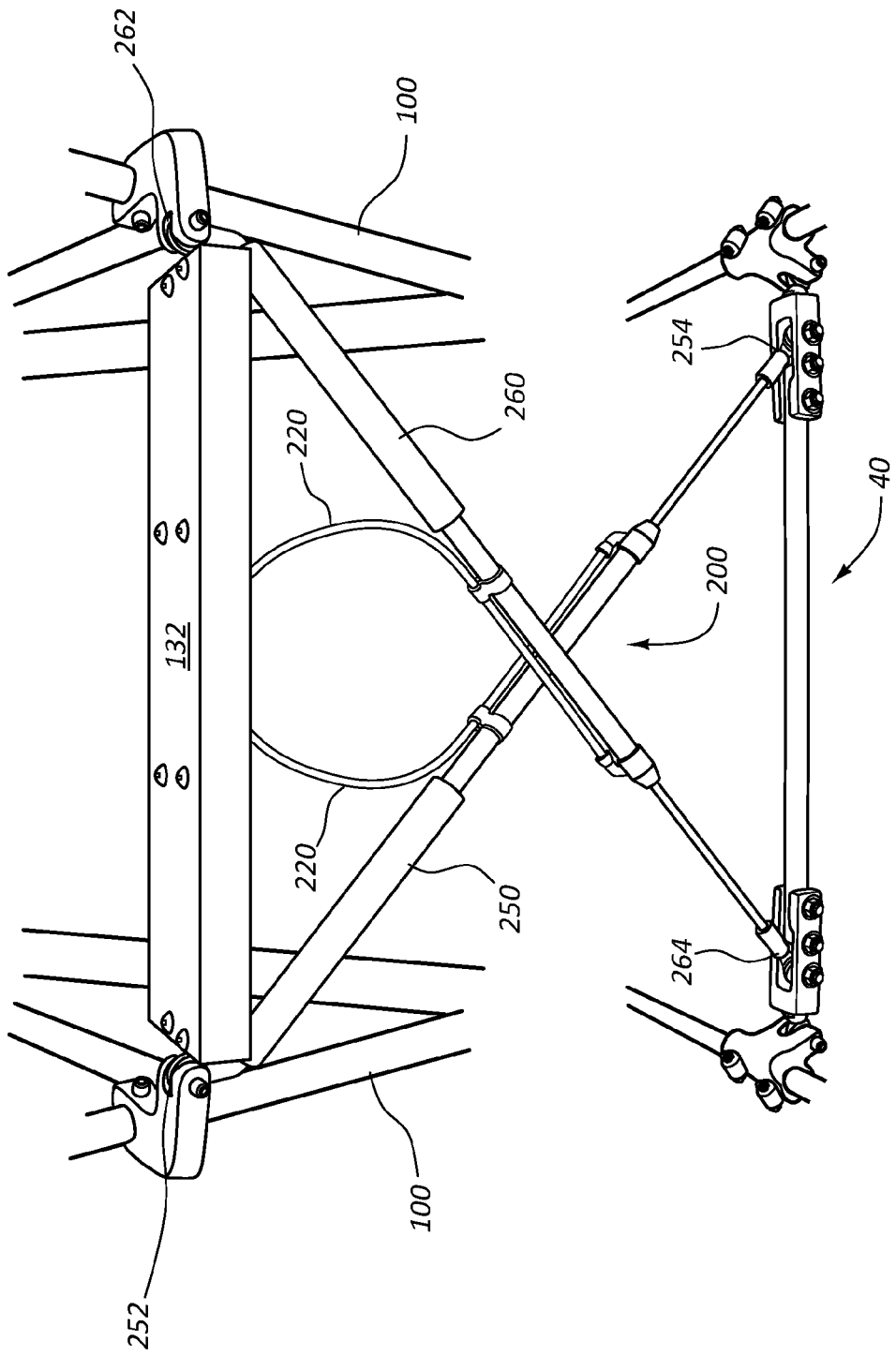
FIG. 19A is a close up, perspective view of a side-by-side bicycle adapter with a hydraulic tilting mechanism in accordance with various representative embodiments of the present invention.

Referring now to FIG. 19A, a perspective rear view of a hydraulic tilting mechanism 200 is shown. In some embodiments, hydraulic tilting mechanism 200 further comprises a first hydraulic piston 250 that is pivotally coupled to chassis 140 via a first upper piston mount 252, and further pivotally coupled to the rear axle connector 40 by a first lower piston rod mount 254. Hydraulic tilting mechanism 200 further comprises a second hydraulic piston 260 that is pivotally coupled to chassis 140 via a second upper piston mount 262, and further pivotally coupled to a the rear axle connector 40 by a second lower piston rod mount 264. Thus, hydraulic tilting mechanism 200 permits controlled tilting of bicycles 100 within a limited range, wherein this limited range is determined by travel length of the system of hydraulic cylinders 210.

Figure 19B:
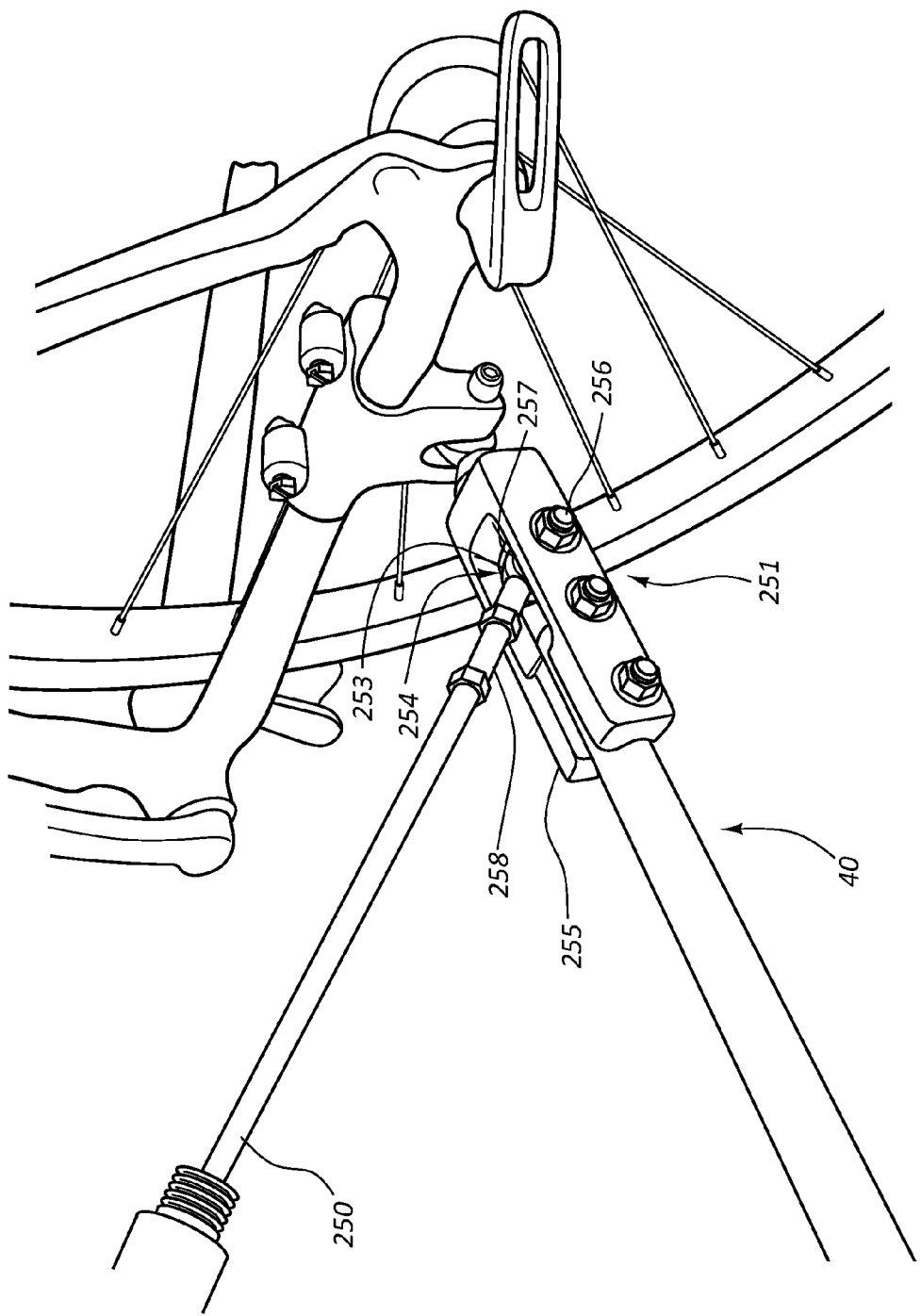
FIG. 19B is a perspective view of a pivotal coupling of a hydraulic piston to a rear axle connector in accordance with various representative embodiments of the present invention.

Referring now to FIG. 19B, in some embodiments, first lower piston rod mount 254 pivotally couples a first hydraulic cylinder 250 to rear axle connector 40, shown as coupling 251. The pivotal coupling 251 comprises an interface eyelet 253 that is secured to mounting interface 255 via an intersecting interface bolt 256. Interface bushings 257 are further provided as spacers to prevent forward and rearward movement of interface eyelet 253 within mounting interface 255. The perpendicular orientation of interface eyelet 253 and interface bolt 256 permits upward and downward pivoting of coupling 251. Forward and rearward pivoting or movement of coupling 251 is accomplished by limiting tolerance between interface bolt 256 and interface eyelet 253. This movement is further limited by the presence of interface bushings 257. Interface eyelet 253 is attached to first hydraulic piston 250 by interface eyelet coupling 258. In some instances, the first upper piston mount 252 comprises a substantially similar pivotal coupling. Likewise, the second upper piston mount 262 and second lower piston mount 264 comprise substantially similar pivotal couplings.

Figure 19C:
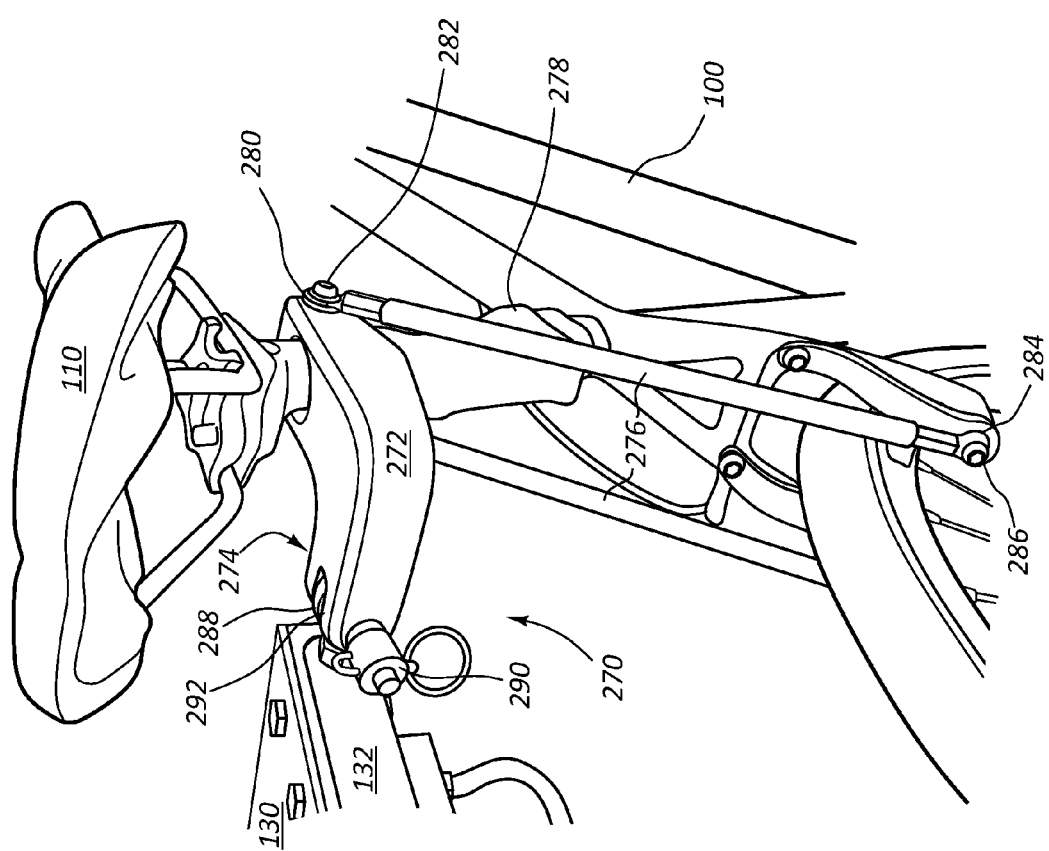
FIG. 19C is a perspective view of a coupling of a carriage adaptor in accordance with various representative embodiments of the present invention.

Referring now to FIG. 19C, in some embodiments main connector carriage 130 further comprises a carriage adaptor 270. Carriage adaptor 270 is configured to couple main connector carriage 130 to the bicycles 100. In some embodiments carriage adaptor 270 limits or prevents forward or backward twisting of main connector carriage 130 relative to bicycles 100. In some instances, carriage adaptor 270 comprises an adaptor body 272, an adaptor hinge 274, and one or more adaptor struts 276. Adaptor body 272 is coupled to bicycle 100 by an adaptor clamp 278. Adaptor body 272 is further braced by adaptor struts 276. Adaptor clamp 278 attaches adaptor body 272 to a seat post tube of bicycle 100. Adaptor struts 276 further brace adaptor body 272 relative to bicycle 100 via an upper eyelet 280 and upper eyelet bolt 282. Adaptor struts 276 are further coupled to bicycle's front forks via a lower eyelet 284 and lower eyelet bolt 286.

Adaptor body 272 is coupled to main connector carriage 130 via an adaptor hinge 274. In some instances, adaptor hinge 274 comprises an adaptor hinge eyelet 288 attached to the main connector carriage 130, an adaptor hinge bolt 290 configured to secure the adaptor hinge eyelet 288 to the adaptor body 272, and one or more adaptor hinge bushings 292. Adaptor hinge bushings 292 are provided as spacers to prevent or limit forward and rearward twisting of the adaptor hinge eyelet 288 within adaptor body 272. Limited tolerance between adaptor hinge bolt 290, as well as the presence of adaptor hinge bushings 292 limit or prevent forward or rearward twisting of adaptor hinge 274.

Figure 20A:
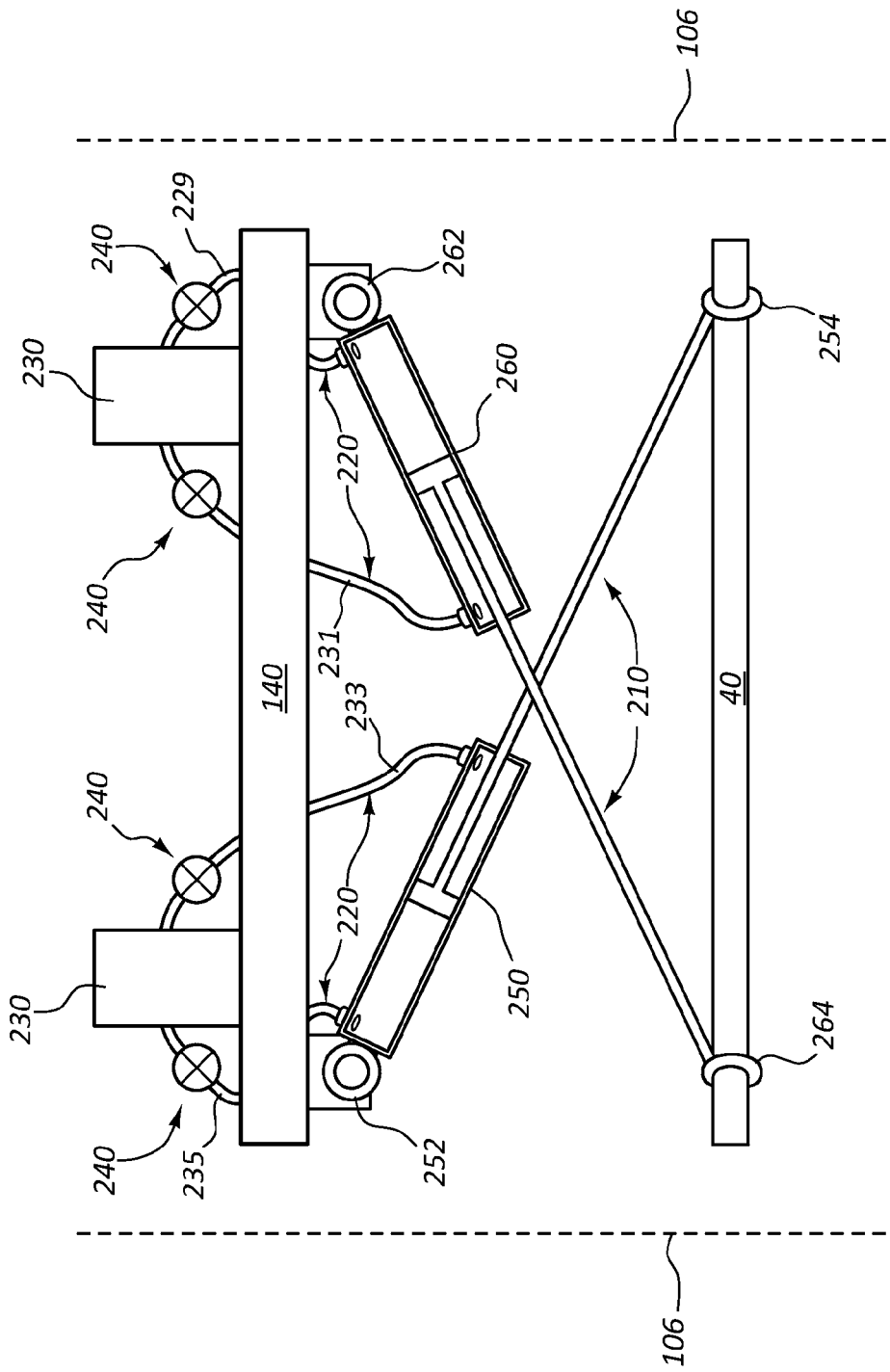
FIG. 20A is a schematic view of a hydraulic tilting mechanism in a neutral position in accordance with various representative embodiments of the present invention.
Figure 20B:
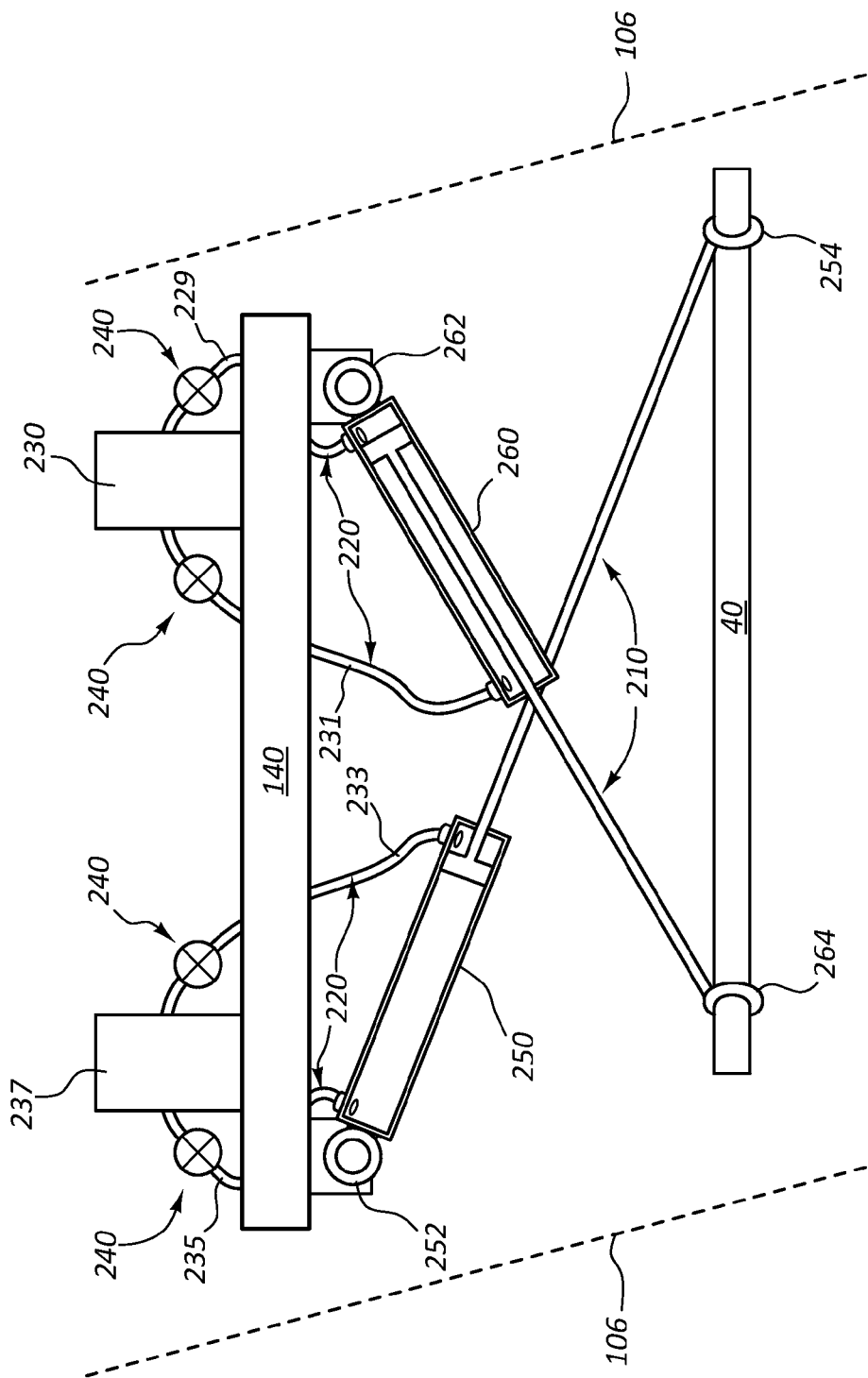
FIG. 20B is a schematic view of a hydraulic tilting mechanism tilting to the left in accordance with various representative embodiments of the present invention.
Figure 20C:
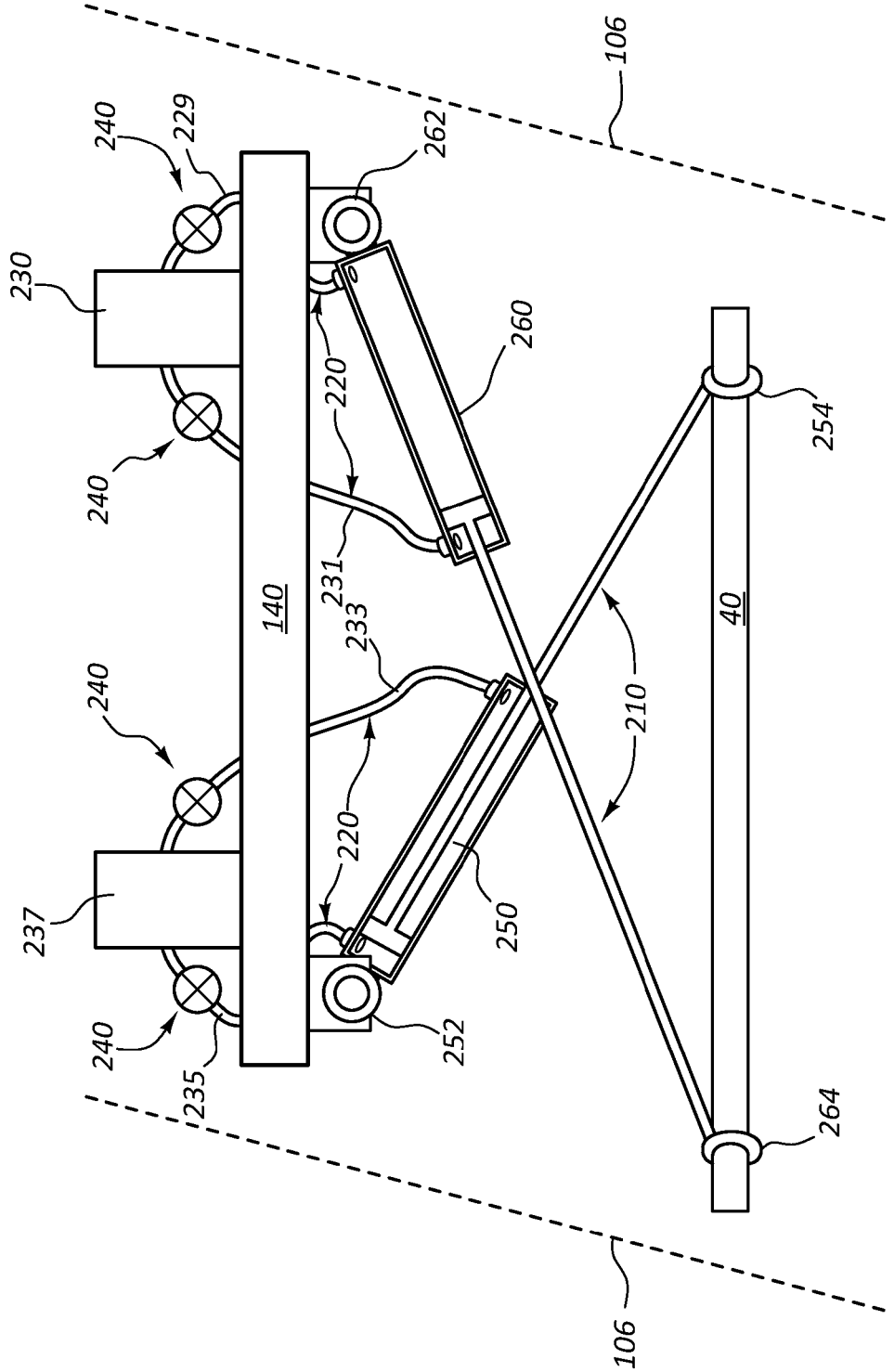
FIG. 20C is a schematic view of a hydraulic tilting mechanism tilting to the right in accordance with various representative embodiments of the present invention.

Referring now to FIGS. 20A-20C, hydraulic tilting mechanism 200 is shown at various tilted positions. It should be noted that although hydraulic tilting mechanism 200 is shown having multiple hydraulic reservoirs, some implementations of the present invention comprise a single hydraulic reservoir, as shown and described in connection with FIGS. 21A-C, below. Thus, rather than providing an individual reservoir for each hydraulic cylinder, a single hydraulic reservoir may be provided and operably coupled to two hydraulic cylinders.

FIG. 20A shows hydraulic tilting mechanism 200 at a neutral position. FIG. 20B shows hydraulic tilting mechanism 200 tilting to the left, and FIG. 20C shows hydraulic tilting mechanism 200 tilting to the right. Dashed lines are provided to represent the plane of wheels 106 which are attached to cross-member 44 when installed on bicycles 100.

In some embodiments, hydraulic tilting mechanism 200 further comprises hosing connectors and hydraulic hoses 220 to permit hydraulic fluid to flow between hydraulic cylinders 210 and dampening reservoirs 230. As hydraulic cylinders 210 extend or compress, hydraulic fluid is flows between dampening reservoir 230 and hydraulic cylinders 250 and 260 via hydraulic hoses 220. In some embodiments, dampening reservoirs 230 can be configured with a restricting orifice to restrict the flow of hydraulic fluid and to provide a dampening effect to the movement of cylinders 210. In some embodiments the dampening effect is adjusted by changing the size of the restricting orifice.

In some embodiments, the hydraulic fluid of the present invention comprises water, oil, a hydrocarbon based compound, or mixtures thereof. In some instances, hydraulic fluid from a single hydraulic piston passes through a single dampening reservoir. In other embodiments, hydraulic tilting mechanism 200 comprises a single dampening reservoir configured to provide hydraulic fluid to two or more hydraulic cylinders. Further, in some embodiments the hydraulic tilting mechanism comprises a single dampening reservoir and a single hydraulic piston. One having skill in the art will appreciate that the specific orientations and configurations of hydraulic cylinders, lines, and reservoirs disclosed herein may be modified within the generally understood principles of hydraulics. Thus, the specific embodiments shown herein are intended for illustrative purposes only and are not intended to limit the scope or practice of the present invention.

Referring now to FIG. 20A, hydraulic cylinders 210 are generally positioned in a midway position between extending and compressing when the tilted orientation of bicycles 100 is neutral. The first hydraulic piston 250 is pivotally coupled to chassis 140 with first upper piston mount 252. Piston 250 is further pivotally coupled to rear axle connector 40 via first lower piston mount 254. Likewise, the second hydraulic piston 260 is pivotally coupled to the chassis 140 and rear axle connector 40 via first upper piston mount 262 and first lower piston mount 264, respectively.

With reference to FIG. 20B, the hydraulic cylinders 210 are configured to compress and extend as they pivotally rotate about first upper piston mount 252, first lower piston mount 254, second upper piston mount 262, and second lower piston mount 264. In general, first and second hydraulic cylinders work in concert, such that hydraulic piston 250 extends and second hydraulic piston 260 compresses when bicycles 100 are tilted to the left. As hydraulic piston 260 compresses, hydraulic fluid in front of the piston is forced out of the cylinder via a first hydraulic line 229 and into reservoir 230, while fluid from reservoir 230 is simultaneously drawn into the cylinder behind piston 260 via a second hydraulic line 231. Conversely, as hydraulic piston 250 extends, hydraulic fluid behind the piston is forced out of the cylinder via a third hydraulic line 233 and into reservoir 237, while fluid from reservoir 237 is simultaneously drawn into the cylinder behind piston 250 via a fourth hydraulic line 235. The reverse process occurs when bicycles 100 are tilted to the right, as shown in FIG. 20C.

Figure 21B:
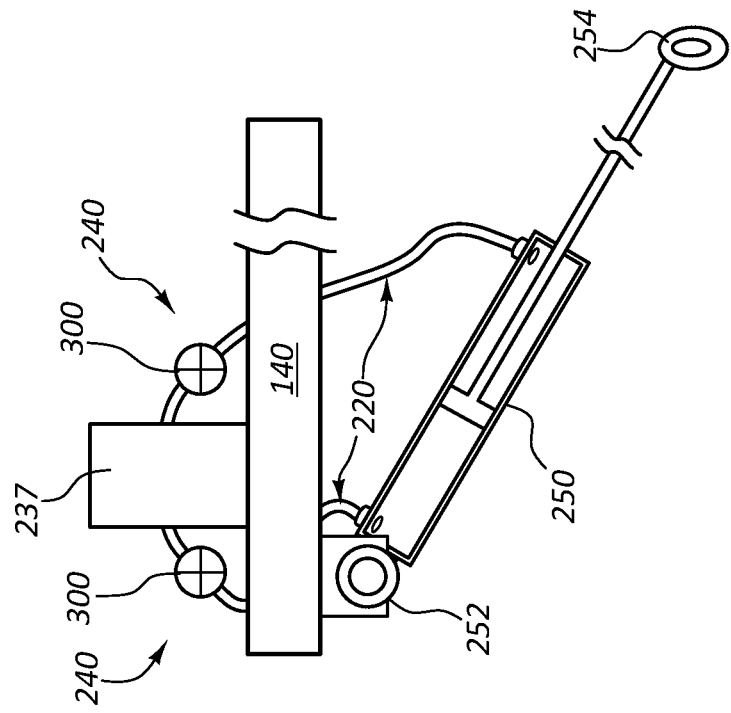
FIG. 21B is a schematic view of a hydraulic locking mechanism in an unlocked position in accordance with various representative embodiments of the present invention.
Figure 21A:
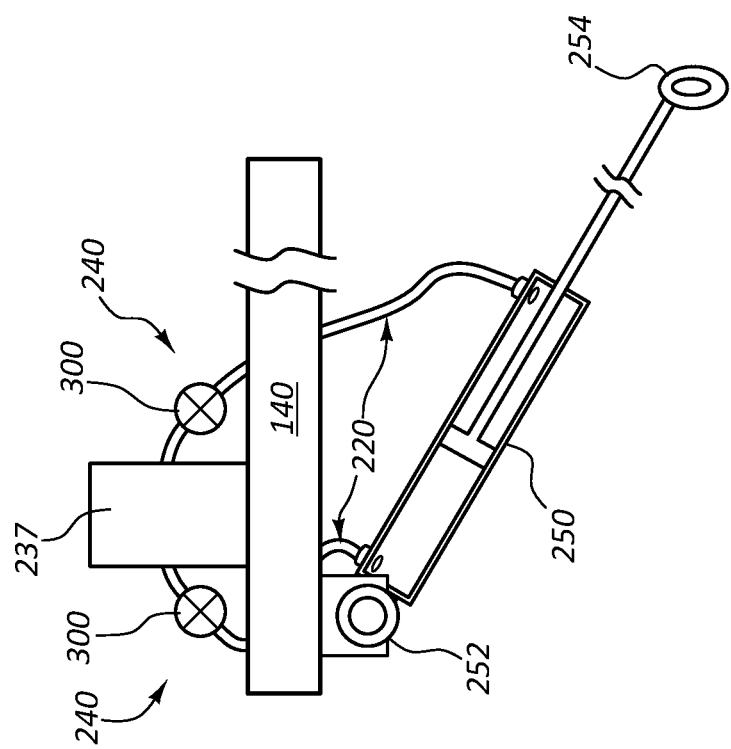
FIG. 21A is a schematic view of a hydraulic locking mechanism in a locked position in accordance with various representative embodiments of the present invention.

Referring now to FIGS. 21A-B, in some instances, main connector carriage 130 further comprises a hydraulic locking system 240 that is configured to block the flow hydraulic fluid through the system, thereby selectively arresting movement of hydraulic tilting mechanism 200. Generally, hydraulic locking system 240 is configured to arrest tilting of hydraulic tilting mechanism 200 at any desired position within the range of motion of hydraulic tilting mechanism 200.

In some embodiments hydraulic locking system 240 comprises a stop valve 300 to mechanically stop flow of the hydraulic fluid. In some embodiments, the hydraulic locking system 240 comprises stop valves 300 located in the hosing connectors and hydraulic hoses 220. In other embodiments, stop valves 300 are located in each hydraulic hose. Hydraulic locking system 240 may further comprise stop valves 300 located in the dampening reservoirs 230.

Referring now to FIG. 21A, hydraulic locking system 240 is shown in an unlocked configuration. When unlocked, hydraulic fluid is free to flow through stop valves 300, the hydraulic hoses, and hydraulic cylinders. Thus, in the unlocked position hydraulic cylinders 210 of tilting system 200 are free to extend or compress thereby allowing bicycles 100 to freely tilt.

Referring now to FIG. 21B, hydraulic locking system 240 is shown in a locked configuration. Upon locking hydraulic locking system 240, stop valves 300 are moved to a closed position and hydraulic fluid prevented from flowing through any of the components and/or hosing. Thus, hydraulic cylinders 210 are prevented from extending or compressing and hydraulic tilting system 200 is prevented from further tilting.

In other embodiments, hydraulic locking system 240 comprises a single master stop valve, as shown in FIG. 22A-22C. In particular, in some instances a single master stop valve is provided comprising a single fluid chamber 560 having an interior volume 550 for storing a hydraulic fluid. Fluid chamber 560 is sealed via a cap 540. In some instances, cap 540 comprises an opening in which is positioned a shaft 520. A fluid-tight seal is maintained between cap 540 and shaft 520, thereby retaining fluid within interior volume 550.

Shaft 520 comprises a first end that is coupled to a handle 500, and further comprises a second end that is coupled to a disk valve 600. Disk valve 600 is rotated within interior volume 550 when handle 500 is rotated. Disk valve 600 comprises a plurality of apertures 620 that are evenly spaced around a perimeter of disk valve 600. Apertures 620 provide multiple pathways through disk valve 600 that may be aligned or misaligned with respective holes 570 provided in fluid chamber 560 when disk valve 600 is rotated.

When disk valve 600 is rotated to align apertures 620 with holes 570, fluid may freely flow between interior volume 550 and hydraulic hoses 640, as shown in FIGS. 22A and 22B. This configuration of the master stop valve may be described as "open." When in the open configuration, fluid within fluid chamber 560 freely flows and interchanges between fluid chamber 560 and hydraulic hoses 640, thus permitting hydraulic cylinders 210 to extend and compress as the bicycles are tilted.

When disk valve 600 is rotated to misalign apertures 620 with holes 570, fluid is prevented from flowing between interior volume 550 and hydraulic hoses 640, as shown in FIG. 22C. This configuration of the master stop valve may be described as "closed." When in the closed configuration, fluid within fluid chamber 560 and hydraulic hoses 640 is arrested, thus preventing hydraulic cylinders 210 from extending and compressing. Therefore, the closed configuration of the master stop valve maintains a current position of the bicycles, and prevents any additional tilting movements.

In some instances, apertures 620 comprise a cross-section area that is less than a cross-section area of holes 570, thereby providing a dampening effect for hydraulic cylinders 210. The area ratio between apertures 620 and holes 570 may be adjusted as needed to achieve a desired rate of compression and extension for hydraulic cylinders 210. In some instances, disk valve 600 is interchangeable, whereby a user may replace disk valve 600 with a disk valve having apertures with a preferred cross-section area. Apertures 620 may further comprise one-way valves to provide one-way dampening for hydraulic cylinders 210.

One having skill in the art will appreciate that the structural components of the various embodiments of the present invention may be modified within the spirit and teaching of the present invention. Accordingly, the embodiments shown and discussed herein are provided to assist the reader in understanding the underlying principles and methodologies of the present invention.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A side-by-side bicycle adapter, comprising:
    a steering connection assembly having a first connector configured to attach to a fork of a first bicycle, and further having a second connector configured to attach to a fork of a second bicycle, the steering connection assembly further comprising a track rod having a first ball joint connection with the first connector and a second ball joint connection with the second connector;
    a main connector carriage having a forward cross-member interconnecting the first and second bicycles at a forward portion, the forward cross-member providing a first bearing connection between the first and second bicycles, a rearward cross-member interconnecting the first and second bicycles at a rearward portion, the rearward cross-member providing a second bearing connection between the first and second bicycles, a central support interconnecting the forward and rearward cross-members;
    a rear axle connector comprising a cross-member providing a third bearing connection approximately between a rear axle of the first bicycle and a rear axle of the second bicycle;
    a tilting mechanism interposed between the first and second bicycles and having a first end pivotally coupled to the rear axle connector and further having a second end pivotally coupled to the rearward cross-member; and
    a braking system coupled to the tilting mechanism to selectively arrest movement of the tilting mechanism at any desired position.

2. The adapter of claim 1, wherein the tilting mechanism comprises:
    a first cylinder having a first end pivotally coupled to the rear axle connector via a first lower piston rod mount, and further having a second end pivotally coupled to the rearward cross-member via a first upper piston mount; and
    a second cylinder having a first end pivotally coupled to the rear axle connector via a second lower piston rod mount, and further having a second end pivotally coupled to the rearward cross-member via a second upper piston mount, the first and second cylinders overlapping one another.

3. The adapter of claim 2, wherein the braking system maintains a tilted position of the adapter.

4. The adapter of claim 2, wherein the braking system is hydraulic.

5. The adapter of claim 4, wherein the braking system further comprises a master stop valve comprising a fluid chamber having an interior volume for storing a hydraulic fluid, a cap for retaining the hydraulic fluid in the interior volume, and a plurality of holes coupled to the plurality of hydraulic hoses, wherein the first and second cylinders are in fluid communication with the interior volume via the plurality of hydraulic hoses and the plurality of holes; and
    a shaft having a first end comprising a handle positioned externally to the interior volume, and a second end comprising a disk valve positioned within the interior volume, the disk valve comprising a plurality of apertures that are capable of being aligned or misaligned with the plurality of holes by rotating the disk valve via the shaft and the handle.

6. The adapter of claim 5, wherein a cross-section area of the plurality of apertures is less than a cross-section area of the plurality of holes.

7. The adapter of claim 5, further comprising a fluid-tight seal between the shaft and the cap.

8. A method for manufacturing a side-by-side bicycle adapter, the method comprising:

providing a steering connection assembly having a first connector configured to attach to a fork of a first bicycle, and further having a second connector configured to attach to a fork of a second bicycle, the steering connection assembly further comprising a track rod having a first ball joint connection with the first connector and a second ball joint connection with the second connector;

providing a main connector carriage having a forward cross-member for interconnecting the first and second bicycles at a forward portion, the forward cross-member providing a first bearing connection between the first and second bicycles, a rearward cross-member for interconnecting the first and second bicycles at a rearward portion, the rearward cross-member providing a second bearing connection between the first and second bicycles, and a central support for interconnecting the forward and rearward cross-members;

providing a rear axle connector comprising a cross-member for providing a third bearing connection approximately between a rear axle of the first bicycle and a rear axle of the second bicycle;

coupling a tilting mechanism between the first and second bicycles, the tilting mechanism having a first end pivotally coupled to the rear axle connector and further having a second end pivotally coupled to the rearward cross-member; and coupling a braking system to the tilting mechanism, the braking system being capable of selectively arresting movement of the tilting mechanism at any desired position.

9. The method of claim 8, wherein the tilting mechanism comprises:

a first cylinder having a first end pivotally coupled to the rear axle connector via a first lower piston rod mount, and further having a second end pivotally coupled to the rearward cross-member via a first upper piston mount; and a second cylinder having a first end pivotally coupled to the rear axle connector via a second lower piston rod mount, and further having a second end pivotally coupled to the rearward cross-member via a second upper piston mount, the first and second cylinders overlapping one another.

10. The method of claim 9, wherein the braking system maintains a tilted position of the adapter.

11. The method of claim 9, wherein the braking system is hydraulic.

12. The method of claim 11, wherein the hydraulic braking system further comprises a fluid chamber having an interior volume for storing a hydraulic fluid, a cap for retaining the hydraulic fluid in the interior volume, and a plurality of holes coupled to the plurality of hydraulic hoses, wherein the hydraulic cylinders are in fluid communication with the interior volume via the plurality of hydraulic hoses and the plurality of holes; and a shaft having a first end comprising a handle positioned externally to the interior volume, and a second end comprising a disk valve positioned with the interior volume, the disk valve comprising a plurality of apertures that are capable of being aligned or misaligned with the plurality of holes by rotating the disk valve via the shaft and the handle.

13. The method of claim 12, further comprising a step for providing a fluid-tight seal between the shaft and the cap.

14. The method of claim 9, further comprising a step for dampening the first and second cylinders.

* * * * *